US010878812B1

(12) United States Patent
Helwani et al.

(10) Patent No.: US 10,878,812 B1
(45) Date of Patent: Dec. 29, 2020

(54) DETERMINING DEVICES TO RESPOND TO USER REQUESTS

(71) Applicant: Amazon Technologies, Inc., Seattle, WA (US)

(72) Inventors: Karim Helwani, Mountain View, CA (US); Venkata Snehith Cherukuri, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 16/143,159

(22) Filed: Sep. 26, 2018

(51) Int. Cl.
*G10L 15/00* (2013.01)
*G10L 15/20* (2006.01)
*G10L 15/22* (2006.01)
*G10L 25/18* (2013.01)
*G10L 15/28* (2013.01)
(Continued)

(52) U.S. Cl.
CPC .............. *G10L 15/22* (2013.01); *G10L 15/28* (2013.01); *G10L 25/18* (2013.01); *G10L 25/21* (2013.01); *G10L 25/84* (2013.01); *G10L 2015/223* (2013.01)

(58) Field of Classification Search
CPC ......... G10L 15/22; G10L 15/02; G10L 15/26; G10L 2015/223; G10L 25/51; G10L 15/18; G10L 15/24; G10L 15/28; G10L 25/84; G10L 15/00; G10L 15/265; G10L 15/30; G10L 15/32; G10L 17/02; G10L 17/08; G10L 17/22; G10L 15/20; G10L 25/48; G10L 25/78; G06F 3/167; G06F 1/3206; G06F 1/3231; H04R 3/005; H04R 1/406; H04R 2410/01
See application file for complete search history.

(56) References Cited

U.S. PATENT DOCUMENTS 8,755,432 B2 * 6/2014 Antonellis ............ G10L 19/008
375/240.01
9,336,767 B1 * 5/2016 Barton .................... G10K 11/16
(Continued)

OTHER PUBLICATIONS

[Lei, Kehua and Ma, Tianyi and Jia, Jia and Zhang, Cunjun and Yang, Zhihan] "Design and Implementation of a Disambiguity Framework for Smart Voice Controlled Devices" Proceedings of the Twenty-Eighth International Joint Conference on Artificial Intelligence Demos. pp. 6536-6538 Jul. 2019 (Year: 2019).*

*Primary Examiner* — Michael Ortiz-Sanchez
(74) *Attorney, Agent, or Firm* — Lee & Hayes, P.C.

(57) ABSTRACT

This disclosure describes techniques for selecting which device to respond to user speech within an environment that includes multiple devices. To enable this selection, the techniques described herein create a model indicating a topology of the devices within the environment. To do so, features associated with the user speech are generated and used to generate multi-dimensional points, each representing a corresponding user utterance. The techniques may then group these multi-dimensional points into clusters before projecting the resulting clusters into two dimensions. The two-dimensional clusters may then be used to generate a model (e.g., a Voronoi diagram) representing regions of the environment, with the centroid of each region being associated with a respective device. When a user makes a subsequent request, the user may be localized within one of the regions and the device associated with that region may be chosen to respond to the user.

20 Claims, 12 Drawing Sheets

(51) Int. Cl.
   *G10L 25/21*   (2013.01)
   *G10L 25/84*   (2013.01)

(56) References Cited

U.S. PATENT DOCUMENTS

| | | | |
|---|---|---|---|
| 10,210,882 B1* | 2/2019 | McCowan | G10L 21/0216 |
| 10,306,394 B1* | 5/2019 | Zhu Jin | G06F 1/1643 |
| 2011/0264447 A1* | 10/2011 | Visser | G10L 25/78 |
| | | | 704/208 |
| 2011/0295603 A1* | 12/2011 | Meisel | G10L 15/07 |
| | | | 704/246 |
| 2012/0062700 A1* | 3/2012 | Antonellis | H04N 9/87 |
| | | | 348/43 |
| 2013/0060571 A1* | 3/2013 | Soemo | G06F 3/011 |
| | | | 704/251 |
| 2015/0095026 A1* | 4/2015 | Bisani | H04R 3/005 |
| | | | 704/232 |
| 2015/0228274 A1* | 8/2015 | Leppanen | G10L 15/28 |
| | | | 704/243 |
| 2016/0063997 A1* | 3/2016 | Nemala | G10L 25/06 |
| | | | 704/233 |
| 2016/0150575 A1* | 5/2016 | Andersen | H04W 76/14 |
| | | | 370/329 |
| 2016/0180853 A1* | 6/2016 | VanLund | G10L 17/22 |
| | | | 704/275 |
| 2016/0373269 A1* | 12/2016 | Okubo | G10L 15/24 |
| 2017/0025124 A1* | 1/2017 | Mixter | G10L 15/22 |
| 2017/0076720 A1* | 3/2017 | Gopalan | G10L 15/22 |
| 2017/0083285 A1* | 3/2017 | Meyers | G10L 15/00 |
| 2018/0277107 A1* | 9/2018 | Kim | G10L 15/28 |
| 2019/0103848 A1* | 4/2019 | Shaya | G06F 3/167 |
| 2019/0108837 A1* | 4/2019 | Christoph | H04S 7/303 |
| 2020/0154200 A1* | 5/2020 | McCowan | H04R 1/406 |

* cited by examiner

DETERMINING DEVICES TO RESPOND TO USER REQUESTS

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. Some users thus place multiple voice-enabled devices throughout their homes to receive and respond to their voice commands in different locations in their homes. Having multiple voice-enabled devices placed throughout an environment increases the complexity of determining how to respond to a voice command. Provided herein are specific technical solutions for improving existing systems so they are more useful for users having multiple voice controlled devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
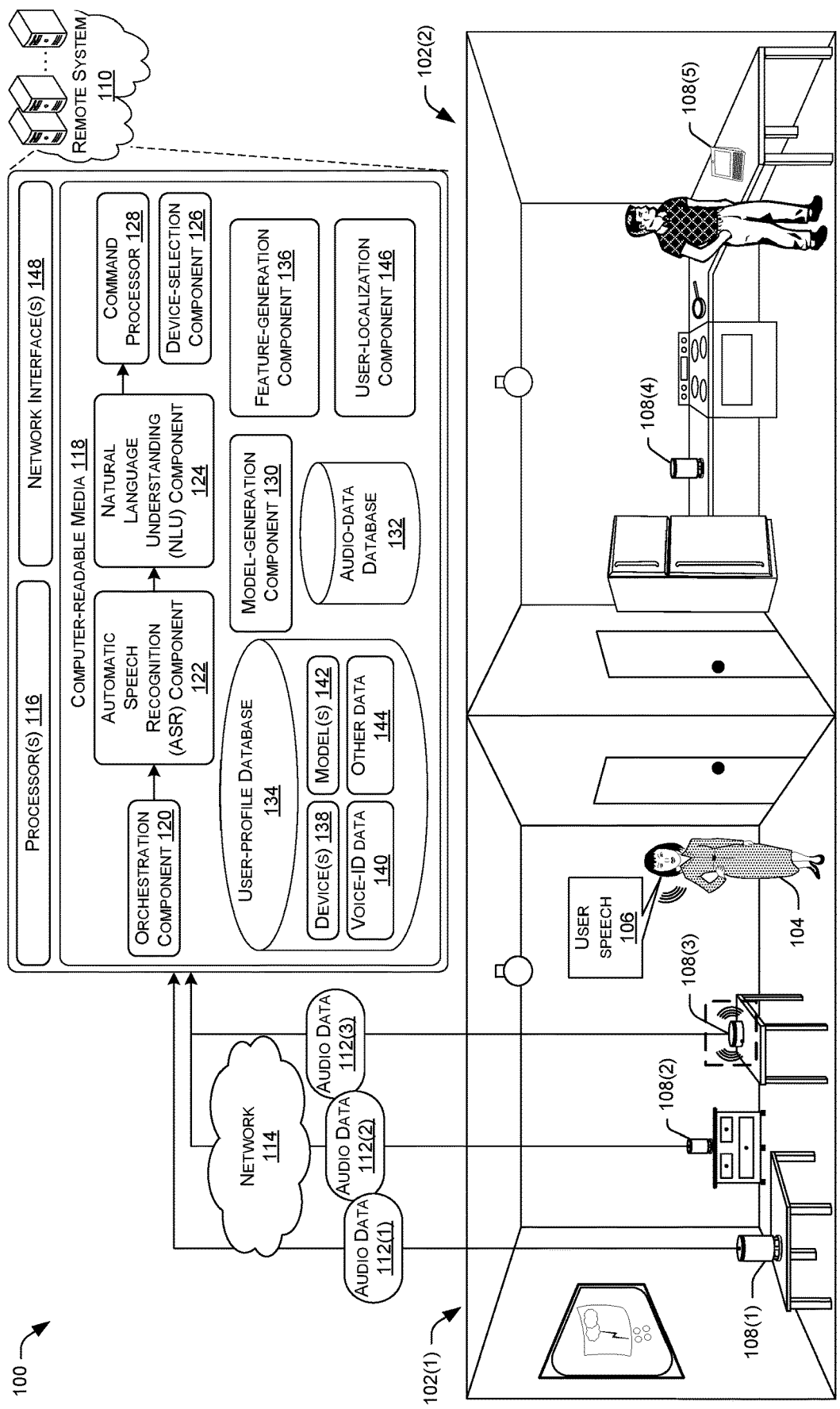
FIG. 1 illustrates a schematic diagram of an illustrative environment in which a user issues a speech utterance, multiple voice-enabled devices detect the speech utterance, and a remote system determines which of the voice-enabled devices is to respond to the speech utterance.

With the proliferation of sound-controlled computing devices, sometimes referred to herein as "voice-enabled devices," users are able to interact with more of their computing devices through speech. For instance, a user may utter a command or make other types of sound(s), which is sometimes referred to herein as "voice commands," via speech or other types of sounds to a voice-enabled device. In response, the device by itself and/or with other computing systems (e.g., remote computing systems) performs at least one operation, such as turning on/off an appliance, receiving music data, performing a telephone call, etc. Due to the usefulness of these voice-enabled devices, users often have multiple devices in an environment, such as their home. While multiple voice-enabled devices may increase user convenience and satisfaction throughout their home, in situations in which multiple voice-enabled devices are near each other (such as within a single room, in adjoining rooms, or otherwise close enough to capture the same voice command), it may be more difficult to determine which of the voice-enabled devices is best to continue capturing audio representing the voice command and/or respond to the command in the speech utterance.

For instance, if multiple voice-enabled devices detect a wake word or other indicator of the start of a voice command from a user, it may be more difficult to determine which of the voice-enabled devices should "listen" to the remaining portion of the voice command and/or determine which of the voice-enabled devices is to respond to the command. For example, envision that a user states "wakeup, what time is my next meeting?" within a user environment that includes multiple voice-enabled devices configured to receive data representing the appropriate answer and output (e.g., visually, audibly, etc.) this data. In these instances, one or more of the devices may be selected to do so, such as the device(s) being located closest to the user making the requesting.

Described herein, therefore, are technological techniques for generating maps of user environments, with each map designating multiple regions that are each associated with a particular user device. Thereafter, when the example user above asks, "what time is my next meeting?", the techniques may attempt determine in which region of the corresponding map the user resides in and may select the user device associated with the selected region for responding to the query. Of course, while examples described herein discuss a single device responding to such a query, it is to be appreciated that multiple devices may be selected in some instances.

In some instances, the techniques described herein may generate a map of a user environment based, at least in part, on features generated from prior user speech within a user environment. For example, as users within the user environment provide voice commands over time, features associated with audio signals generated by the voice-enabled devices may be generated and used to begin to generate a map or "topology" of the locations of these devices within the environment. The features used to generate these maps may include features of the audio signals themselves, such as signal-to-noise (SNR) ratios in different frequency bands, Spectro-temporal structured sparsity, time-domain onset strength, flatness (or "tonality"), harmonic ratio, spectral roll-off, and/or the like. In addition to audio-signal features, contextual features and/or user-centric features may be used in generating these maps. The contextual features may include the geolocation of the user environment, the identity of the user account associated with the environment signal data indicating the presence of certain mobile devices and the strength of this signal data, and/or the like. User-centric features may include, for example, the identity of the user speaking, their historical interactions with voice-enabled devices in the environment, and/or the like.

As described below, each voice command may initially be associated with a point in multi-dimensional space based on features associated with that command. The number of dimensions of the point may correspond to the product of the number of devices in the user environment and the number of features being analyzed. To provide an example, envision that a user environment includes three voice-enabled devices and that ten different features are being utilized to build the map. In this example, each voice command may be associated with a point in thirty-dimensional space (the product of three devices and ten features). In instances, where a particular device does not "hear" a voice command (e.g., because it resides too far from the location of the speaker of the command), the value of the audio features for that device may be deemed zero.

Furthermore, as each voice command is uttered within this example user environment, the techniques may generate a corresponding point in thirty-dimensional space based on the features of the respective voice command. After a threshold number of voice commands have been received, the techniques may apply a clustering algorithm to these multi-dimensional points to generate clusters of points in multi-dimensional space. In some instances, the number of clusters may be equal to the number of devices associated with the user environment (for instance, three in this example). In some instances, the techniques use k-means clustering for generating the clusters in multi-dimensional space.

After clustering these multi-dimensional points into multi-dimensional clusters, these clusters may be reduced into two-dimensional space (e.g., two-dimensional Euclidian plane) to represent the user environment in which the devices reside. For example, linear discriminant analysis (LDA), principal component analysis (PCA), or the like, may be applied to the multi-dimensional clusters to reduce these clusters into a two-dimensional Euclidian plane. Of course, while example algorithms are described, it is to be appreciated that any other algorithm for reducing the dimensionality of the clustered points may be utilized.

The techniques may inform the dimension-reduction algorithm, such as LDA, of the inferred cluster labels (e.g., corresponding to the number of devices in the user environment). Informing the dimension-reduction algorithm with the inferred cluster labels may ensure that the dimension-reduction algorithm outputs labels for the points in closed and bounded sets. Each closed and bounded set may correspond to a region or "partition". Therefore, the dimension-reduction algorithm may effectively output a representation of the user environment in the form of a Voronoi diagram having k partitions (or "regions"), with each clustered point corresponding to the one of the partitions. That is, the output of the algorithm may comprise a two-dimensional map that comprises regions and associated boundaries, with each clustered point being assigned a label indicating which region the point belongs to. Given that the number of labels provided to the dimension-reduction algorithm corresponds to the number of devices in the user environment, the resulting Voronoi diagram may comprise a number of k partitions equal to this number of devices.

After a map of the environment has been generated, the techniques may associate each region of the map with a particular user device. In the example above, for instance, the map may include k number of regions (with k being equal to three, the number of voice-enabled devices) and each of the k regions may be associated with one of the three voice-enabled devices associated with the user environment.

Subsequent to generation of this map (or "topology"), a user may issue a voice command in the environment. In response, the techniques may attempt to localize the user that provided this voice command in order to select a device to respond to the command. To begin, the techniques may generate features associated with this voice command. Continuing the example above, the techniques may generate ten different features associated with this voice command, with three values associated with each of these features. The techniques may then calculate a point in thirty-dimensional space based on these generated features and, thereafter, may reduce this multi-dimensional point into a two-dimensional point. Again, LDA, PCA, or any other linear reduction algorithm may be used to reduce this dimensionality of this point. For example, the inferred cluster labels may be input into the dimension-reduction algorithm such that the algorithm outputs an indication of which partition (or "region") the point belongs to of the k-number of partitions/regions of the current user-environment topology. The techniques may then determine which voice-enabled device is associated with this region and may instruct this device to respond to the voice command. For example, if the request was "Play Bob Dylan", the techniques may instruct the device associated with the region of the point to begin outputting the audio requested by the user.

One or more different classifiers may be used in order to localize a user by selecting a partition (e.g., of the outputted Voronoi diagram) to associate with the user, such that the device associated with the selected partition may respond to the user request. As described above, the feature vector inputted into the chosen classifier may comprise a concatenation of the features generated from each of the audio signals generated by each device in the environment (with a feature value of zero for devices that didn't hear the user request and, hence, did not generate a corresponding audio signal). In some instances, a score may be calculated based on energy associated with each signal (x, i). An example array may be represented as follows:

$$y := [h_1^T(x_1 1)^T, h_2^T(x_1 1)^T, \ldots, h_N^T(x_N 1)^T]^T$$

Where $h_i^T$ corresponds to a "bias factor" of the i-th user device modeled as a linear model with two parameters defining a slope and an additive bias. $x_i$, meanwhile, describes the voice energy at the i-th device. In a supervised problem solution setting, the parameters of $h$, can be derived by employing an algorithm to minimize an empirical risk based on a zero-to-one loss function. Once the coefficients are found, each user device may pre-process its energy value independently of the energy value of the other user devices and hence, the detection does not depend on a certain combination of energy values.

In some instances, however, the minimization of the empirical risk on a loss function can be time-consuming and, thus, other differentiable loss functions may be used to employ more efficient optimization techniques. The following may be used to formally model the decision problem that may be solved using a binary loss function, if a particular device (device 1) is the targeted device:

$$\begin{pmatrix} 1 \\ -1 \\ \vdots \\ -1 \end{pmatrix} = \text{sgn}\left\{ \begin{pmatrix} (x_1 1) & 0 & 0 & 0 \\ 0 & (x_2 1) & 0 & 0 \\ \vdots & \ldots & \ddots & \vdots \\ 0 & 0 & \ldots & (x_N 1) \end{pmatrix} \begin{pmatrix} h_1^T \\ h_2^T \\ \vdots \\ h_N^T \end{pmatrix} \right\}$$

Hence, instead of minimizing the empirical risk, a binary classifier for each device can be derived where the two classes are describing if the device is "winning" or "losing" the arbitration. With this formulation a convex loss function can be taken such as the hinge or logistic loss function.

The classifier described thus far may be understood as a block diagonal classifier. In some instances, a full classifier may be utilized, which takes into account a current spatial configuration of a group of devices, whereas a block-diagonal classifier may be more robust to configuration changes (that is, changes in the topology of user device in the environment) and is thus more suitable for offline lab training.

Given the above introductory description of using a classifier for selecting a Voronoi partition for a user (i.e., localizing a user) for the purpose of selecting a device to respond to a user request, the following description describes one example implementation of a block-diagonal classifier that may be used. Again, however, it is to be appreciated that other classification techniques may be used.

In the example below, the classifier need not take the geometric arrangement of the user devices in a specific user environment into account. Instead, the classifier may calculate a score for each device based on audio features independently, with the calculated score translating into a distance between the user that uttered the speech and a respective device. In some instances, the user device associated with the highest calculated score corresponds to the closest device to the user making the request. That is, the device associated with the Voronoi partition having the highest score may be selected as the partition associated with the user. This classifier may be, therefore, highly parallelizable and useful from a distributed computation point-of-view.

In some instances, generating the initial classifier may include arranging multiple user devices in a predefined orientation (e.g., a grid) and having users utter speech requests to one of these user devices at a time. The audio data processed by the devices may then be analyzed and audio features may be extracted. As described in detail below, the features may include a spectral centroid and spread, energy, spectral entropy, onset strength, flatness, harmonic ratio, Spectro-temporal sparsity, spectral roll-off, and/or the like.

Thereafter, each of the resulting feature vectors corresponding to each device may be classified into two classes, such as a "winner class" that includes the feature vector set whenever the device under consideration is targeted by the test subject and a "loser class" including the set of feature vectors calculated whenever the device is not targeted. The following block-diagonal matrices for the winning device may then be defined for M features, P devices, and N samples:

$$\mathcal{D}^{win} := blkdiag\left\{ \begin{pmatrix} f_{1,1}^{1\,win} & \cdots & f_{M,1}^{1\,win} \\ \vdots & \ddots & \vdots \\ f_{1,N}^{1\,win} & \cdots & f_{M,N}^{1\,win} \end{pmatrix}, \ldots, \begin{pmatrix} f_{1,1}^{P\,win} & \cdots & f_{M,1}^{P\,win} \\ \vdots & \ddots & \vdots \\ f_{1,N}^{P\,win} & \cdots & f_{M,N}^{P\,win} \end{pmatrix} \right\}_{\text{for P devices}} =$$

$$\begin{pmatrix} \begin{pmatrix} f_{1,1}^{1\,win} & \cdots & f_{M,1}^{1\,win} \\ \vdots & \ddots & \vdots \\ f_{1,N}^{1\,win} & \cdots & f_{M,N}^{1\,win} \end{pmatrix} & \cdots & \begin{pmatrix} 0 & \cdots & 0 \\ \vdots & \ddots & \vdots \\ 0 & \cdots & 0 \end{pmatrix} \\ \vdots & \ddots & \vdots \\ \begin{pmatrix} 0 & \cdots & 0 \\ \vdots & \ddots & \vdots \\ 0 & \cdots & 0 \end{pmatrix} & \cdots & \begin{pmatrix} f_{1,1}^{P\,win} & \cdots & f_{M,1}^{P\,win} \\ \vdots & \ddots & \vdots \\ f_{1,N}^{P\,win} & \cdots & f_{M,N}^{P\,win} \end{pmatrix} \end{pmatrix},$$

Where $f_{m,n}^{p\,win}$ denotes the preferably standardized feature m extracted from the sample n using the device p when p is winning an arbitration.

Further, for N'=N/P samples of losing devices, the following matrix may be defined:

$$\mathcal{D}^{\prime lose} := \begin{pmatrix} \begin{pmatrix} f_{1,1}^{1\,lose} & \cdots & f_{M,1}^{1\,lose} \\ \vdots & \ddots & \vdots \\ f_{1,N'}^{1\,lose} & \cdots & f_{M,N'}^{1\,lose} \end{pmatrix} & \cdots & \begin{pmatrix} 0 & \cdots & 0 \\ \vdots & \ddots & \vdots \\ 0 & \cdots & 0 \end{pmatrix} \\ \vdots & \ddots & \vdots \\ \begin{pmatrix} 0 & \cdots & 0 \\ \vdots & \ddots & \vdots \\ 0 & \cdots & 0 \end{pmatrix} & \cdots & \begin{pmatrix} f_{1,1}^{P\,lose} & \cdots & f_{M,1}^{P\,lose} \\ \vdots & \ddots & \vdots \\ f_{1,N'}^{P\,lose} & \cdots & f_{M,N'}^{P\,lose} \end{pmatrix} \end{pmatrix},$$

$$\mathcal{D}^{lose} := \begin{pmatrix} \mathcal{D}^{\prime lose} \\ \mathcal{D}^{\prime lose} \\ \vdots \\ \mathcal{D}^{\prime lose} \end{pmatrix},$$

Where $f_{m,n'}^{p\,lose}$ denotes the feature, m extracted from the sample n' using the device p-th device which is losing an arbitration.

The optimization problem may then be solved as:

$$\min_{w} \left\{ w^H R_{\mathcal{D}^{\prime lose}} w \right\},$$

$$\text{s.t.} (\mathcal{D}^{lose} - \mathcal{D}^{win}) w \leq 0.$$

Where $R_{\mathcal{D}^{\prime lose}} := \hat{\varepsilon}\{\mathcal{D}^{\prime lose} \mathcal{D}^{\prime lose\,H}\}$ denotes an estimation of the expectation of the autocorrelation matrix and $\{.\}^H$ denotes a Hermitian transponation. In order to solve this optimization problem, the Lagrangian multiplier approach may employed and the cost function is approximated by the following:

$$\min_{w} \left\{ \lambda \cdot w^H R_{\mathcal{D}^{\prime lose}} w - \sum_{i} \log(-(\mathcal{D}_i^{lose} - \mathcal{D}_i^{win}) w) \right\},$$

where $\mathcal{D}_i^{lose,win}$ corresponds to the i-th row in $\mathcal{D}^{lose,win}$ and $\lambda$ is a suitably chosen Lagrangian multiplier. The optimization can be done using the Newton algorithm, by calculating the gradient g and Hessian H of the cost function and performing a recursive update according to the following:

$$w(n+1)=w(n)-H^{-1}g.$$

The resulting vector w is of the structure w=[$w_1$ $w_2$ ... $w_P$] where the sub-vector, $w_P$ denotes the linear operator which can be applied to the features extracted from the p-th device to calculate the desired score. Thereafter, the device with the highest score may be regarded as the "winning" device and may be selected to respond the user request.

In addition to the above, the techniques may continually or periodically update the topology of the user environment based on received voice commands. For instance, given that some voice-enabled devices may be movable within the environment, the techniques may continually or periodically update the topology such that the current topology represents the current configuration of the user devices in the environment. For example, as voice commands are received, the user that provided by the voice command may be localized for the purpose of selecting a device to respond to the voice command, and features of the voice command itself may be used to update the map/topology of the user environment.

In addition, other techniques for determining the topology of devices in a user environment may be combined with the above-described techniques to enhance the accuracy of the topologies. In one example, each of the user devices (and/or a remote system) may calculate a time-difference-of-arrival (TDOA) value for a particular voice command, which may be used to validate the topology determined by the feature-extraction methods discussed above. For example, the TDOA values determined by these devices may be used to attempt to place a user associated with a received voice command into a particular region/partition of the current topology, with this result being compared to the resulting region/partition determined via the feature-extraction methods. The result of this comparison may be used to update the model, as described in additional detail below.

Some of the voice-enabled devices described below include various sensors and components to receive and respond to voice commands from users. For example, voice-enabled devices may include one or more microphones to generate audio data that represents voice commands of users. Additionally, the voice-enabled devices may include various components to process the audio data, such as speech-processing components. The voice-enabled devices may be configured to analyze audio data representing voice commands of the users, and perform, in some examples along with one or more other computing devices, various operations that are responsive to the voice commands, such as playing music, playing a movie, setting alarms, and so forth.

In some examples, the voice-enabled devices have relatively low functionality with respect to processing of the audio data. For example, the voice-enabled devices may include pre-processing components to perform less complicated processing on audio data, such as beamforming components, echo-cancellation components, wake-word detection components, and so forth. In such examples, the voice-enabled devices may serve as an interface or "middle man" between a remote system, and a user. In this way, the more intensive processing involved in speech processing may be performed using resources of remote systems, which may increase the performance of the speech-processing techniques utilized on audio data generated by the voice-enabled devices. For example, while the voice-enabled devices may be configured with components for determining metadata associated with the audio data (e.g., SNR values, timestamp data, etc.), in some examples the voice-enabled devices may relay the audio data to a speech-processing system which performs processing techniques on the audio data to determine how to respond to voice commands of the users.

Thus, in some examples, some or all of the techniques described herein may be performed by a speech processing and/or other type of remote system (e.g., "cloud-based system," "software as a service (SaaS) system," "network accessible system," etc.), which receives data from the voice-enabled devices and is located remotely from the voice-enabled devices. Each of the voice-enabled devices may access the speech-processing system through a communications network, such as the internet, to provide the speech-processing system with the captured audio data and the various types of contextual information detected, determined, etc., by the voice-enabled devices. In various examples, the voice-enabled devices may receive a "wake" trigger (e.g., wake word, button input, etc.) which indicates to the voice-enabled devices that a user is speaking a command, and the voice-enabled devices begin sending audio data representing the spoken command to the network-based speech service.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which a user 104 utters user speech 106 (e.g., a voice command), multiple voice-enabled devices 108 detect the user speech 106, and a remote system 110 determines which of the voice-enabled devices is to respond to the user speech 106.

As illustrated, the environment 102 may comprise into two different rooms 102(1) and 102(2), where each of the rooms 102 include multiple of the voice-enabled devices 108(1)-108(5) (collectively "voice-enabled devices 108"). One or more of the voice-enabled devices 108 may couple to the remote system 110, which may process audio data (or audio signals) received from the voice-enabled devices 108 and formulate responses to the user 104 along with determining which of the voice-enabled devices 108 is to perform an action responsive to the voice command associated with the speech 106. The remote system 110 may be implemented as one or more computing devices including one or more servers, desktop computers, laptop computers, or the like. In one example, the remote system 110 is configured in a server cluster, server farm, data center, mainframe, cloud computing environment, or a combination thereof. To illustrate, the remote system 110 may include any number of devices that operate as a distributed computing resource (e.g., cloud computing, hosted computing, etc.) that provides services, such as storage, computing, networking, and so on.

The room 102(1) may include the user 104 that is uttering the speech 106, and the voice-enabled devices 108(1)-(3) located in the room 102(1) may each generate audio signals corresponding to the speech 106. For example, the voice-enabled devices 108 may each have one or more microphones that are used to capture user speech 106 and one or more speakers that are used to play speech (e.g., dialogue)

and other audio content. In some embodiments, the voice-enabled devices 108 may be designed to operate from a fixed location, and in other embodiments, the voice-enabled devices 108 may be portable or mobile. For instance, the voice-enabled devices 108 may comprise handheld devices or other mobile devices, such as smartphones, tablet computers, media players, personal computers, wearable devices, various types of accessories, and so forth.

As illustrated, the user 104 may be located in and utter the speech 106 in the room 102(1) that includes the voice-enabled devices 108(1)-(3). In such examples, each of the voice-enabled devices 108(1)-(3) may each generate respective audio data 112(1), 112(2), and 112(3) (collectively "audio data") representing the user speech 106, and transmit, stream, or otherwise send the audio data 112 over a network 114 to the remote system 110. The voice-enabled devices 108 may receive commands from the user 104 via the speech 106, and provide services in response. In some examples, the voice-enabled devices 108 may detect a predefined trigger expression or word (e.g., "awake"), which may be followed by instructions or directives (e.g., "please end my phone call," "please turn off the alarm," etc.). Services provided by the voice-enabled devices 108 in conjunction with the remote system 110 may include performing actions or activities, rendering media, obtaining, and/or providing information, providing information via generated or synthesized speech via the voice-enabled devices 108, initiating Internet-based services on behalf of the user 104, and so forth.

In this example, the voice-enabled devices 108(1)-(3) may receive or capture sound corresponding to the speech 106 of the user 104 via one or more microphones. In certain implementations, the speech 106 may include a wakeword or other trigger expression or event that is spoken by the user 104 prior to a voice command to indicate that subsequent user speech is intended to be received and acted upon by the voice-enabled devices 108 and/or remote system 110. The voice-enabled devices 108 may detect the wakeword and begin sending audio data 112 to the remote system 110. In some instances, the voice-enabled devices 108 may operate in a low-functionality mode and analyze sound using ASR processing. When the wakeword is detected using ASR, the voice-enabled devices 108 may begin sending the audio data, potentially along with other respective metadata, to the remote system 110. The wakeword may be a reserved keyword that is detected locally by the voice-enabled devices 108, such as by using an expression detector that analyzed audio signals produced by the microphones of the voice-enabled devices 108 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In the example illustrated in environment 102, the user 104 utters speech 106 that includes a wakeword, which the voice-enabled devices 108(1), 108(2), and 108(3) each detect within corresponding audio data. However, voice-enabled devices 108(4) and 108(5) may not detect the speech 106 as they are positioned in the other room 102(2). Each of the voice-enabled devices 108(1), 108(2), and 108(3) produce respective audio data 112 representing some or all of the speech 106. In some examples, the audio data 112 may represent other sounds that may trigger a response, such as glass breaking, an appliance beeping, a smoke alarm sounding, a baby crying, etc.

After generating the respective audio data 112, each of the devices 108(1)-(3) may send the audio data 112 to the remote system 110 over one or more networks 114. The one or more networks 114 may include any viable communication technology, such as wired and/or wireless modalities and/or technologies. Networks 114 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some examples, the remote system 110 may include one or more processors 116 and computer-readable media 118 storing various components for determining which voice-enabled devices 108 is to listen to and/or respond to a command in speech 106. The processors 116 may power the components of the remote system 110, such as components stored in the computer-readable media 118. In some examples, the computer-readable media includes an orchestration component 120, which may receive the audio data 112 and may call or otherwise communicate with an automatic speech recognition (ASR) component 122 and a natural language understanding (NLU) component 124 for processing the audio data 112. For example, the orchestration component 120 may send the audio data 112 to the ASR component 122, which may process each of the audio data 112(1)-(3) to generate textual data, each corresponding to the user speech 106. In some examples, the ASR component 122 may generate ASR confidence scores representing the likelihood that a particular set of words of the textual data matches those uttered in the speech 106. For instance, the ASR component 122 may determine a confidence or likelihood that a particular word which matches the sounds would be included in the sentence at the specified location (e.g., using a language or grammar model). Thus, each potential textual interpretation of the speech 106 (hypothesis) is associated with an ASR confidence score. The ASR component 122 may then return the textual data to the orchestration component 120.

In various examples, the textual data corresponding to the speech 106 may be sent from the orchestration component 120 to the NLU component 124 to be analyzed or processed by the NLU component 124 to determine an intent expressed by the user 104 in the speech 106. For example, if the user 104 issued a command to "play the Beatles," the NLU component 124 may determine that the user's intent is to cause a device to begin outputting music by a particular band, "the Beatles". Once the intent has been determined by the NLU component 124, the orchestration component 120 may pass intent data to a device-selection component 126 to use to determine which of the voice-enabled devices 108 is to respond to the voice command of the speech 106. The device-selection component 126 may determine which voice-enabled device 108 is to respond to the voice command of the speech 106 based on the intent received from the NLU component 124, and potentially other data.

For instance, in some instances the device-selection component may determine which of the devices 108 in the environment 102 are capable of performing the requested action (e.g., outputting the music) and may thereafter select the device deemed closest to the user 104 that uttered the speech 106. In some implementations, the device-selection component 126 may initially localize the user and identify the nearest device, while thereafter determining whether the nearest device is capable of performing the requested action. If so, then the command processor 128 may instruct that device to perform the action (e.g., play the music). If not, then the device-selection module 126 may select another device (e.g., the next closest device), before determining whether that device is capable of performing the action (and so forth). In other instances, meanwhile, the device-selection component 126 may determine, from the devices 108 in the environment, those devices capable of performing the requested action and may thereafter select the nearest device from the capable devices.

In some instances, the device-selection component 126 may utilize a model-generation component 130 and a user-localization component 146 to localize the user 104 within the environment for the purpose of selecting a device to respond to the user speech 106, as described in detail below. At a high level, the model-generation component 130 may generate a model or "topology" of the user environment 102, with this model representing a physical layout of the user devices 108(1)-(5) in the environment. For instance, the model may represent a two-dimensional map that indicates respective locations of the devices 108(1)-(5) relative to one another. For example, the model-generation component 130 may generate a model representing a Voronoi diagram, in which the area representing the user environment 102 is partitioned into multiple regions, with the number of regions equal to the number of user devices 108(1)-(5) in the environment 102 (e.g., five in the illustrated example).

The user-localization component 146, meanwhile, may attempt to localize a user within the model representing the physical layout of the environment 102. For example, the user-localization component 146 may determine, from features associated with the audio data associated with current user speech of the user attempting to be localized, which region of the model the user that uttered the speech resides in. Thereafter, a device associated with that particular region may be selected for responding to the user speech. In combination, the model-generation component 130 and the user-localization component 146 work together to enable a device that is nearest a user to respond to a voice command of a user. Further, given that the model may be updated over time, the generated model takes into account the fact that the devices 108(1)-(5) may move within the environment over time.

Upon determining a voice-enabled device 108 to perform the command or otherwise respond to the user, an indication of the intent associated with the user speech 106 and an indication of the device 108 selected to respond to the user 104 may be provided to the command processor 128. The command processor 128 may include one or more domain speechlets which determine and generate a response for the selected voice-enabled device 108 to perform. In some examples, the command processor 128 may route identified intents to the appropriate speechlets. For example, the speechlets may be specialized software, domains, and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. For example, an intent may include a command to play music (play music intent), the command processor 128 may route the intent to a music domain speechlet configured to execute a music playing command in the example of the user speech "Play the Beatles".

Once the command processor 128 has generated a command, the command processor 128 may provide the command in a response to the determined voice-enabled device 108 to cause the voice-enabled device 108 to perform an operation. For example, the selected device, which may nearest the user 104, may perform functions for outputting the requested music.

As illustrated, the computer-readable media 118 may further store an audio-data database 132, a user-profile database 134, and a feature-generation component 136. The audio-data database 132 may store the audio data 112 received from the user devices 108. The user-profile database 134, meanwhile, may store user-profile data indicative of different characteristics of user accounts, such as a number and identity of voice-enabled devices in a particular user environment, a geolocation associated with a user account, and other account information. FIG. 1, for instance, illustrates that the user-profile database 134 may store device data 138 indicating which devices are associated with an associated user profile (and, hence, a particular user environment), voice-ID data 140 indicating unique data used to identify different users voiceprints, model data 142 indicating current and/or past topologies in a user environment such as the environment 102, and other data 144, with each of these types of data being associated with respective user profiles. For example, a user profile associated with the illustrated user 104 may indicate the geolocation of the user environment 102, the number of devices 108(1)-(5) associated with the environment (e.g., five), voice-ID data used to identify when the user 104 and/or other users associated with the user environment 102 are speaking to the devices 108, and/or the like. As described below, some or all of this data may be used by the feature-generation component 136 and/or the model-generation component 130 for generating a model of the user environment 102.

In order to generate a model representative of a physical layout of the devices 108 within the user environment, the feature-generation component 136 may generate an array of features associated with each user request, such as the voice command indicated by the user speech 106. For example, the feature-generation component may generate one or more audio-data features, one or more contextual features, and/or one or more user-centric features. The audio-data features may comprise any type of feature data that may be determined based on audio data 112 generated by the devices 108. For example, the audio-data features may include data such as signal-to-noise (SNR) ratios in different frequency bands, Spectro-temporal structured sparsity, time-domain onset strength, flatness (or "tonality"), harmonic ratio, spectral roll-off, and/or the like. The contextual features may include data such as a time of day and/or day of the week at which the user speech 106 is uttered, a geolocation of the user environment 102, an indication of signal strength (or lack thereof) between one or more of the devices 108 and others devices (e.g., mobile phones, secondary devices in the environment, etc.) and/or the like.

In some instances, for each user request, such as the voice command represented by the user speech 106, the feature-generation component 136 generates a number of feature values equal to the product of the number of devices 108 in the environment 102 and the number of features being generated. For example, if the feature-generation component 136 is configured to generated ten features associated with the user speech 106, the feature-generation component 136 may generate fifty feature values, given that the environment includes five devices 108(1)-(5). As is described in further detail below, each user request may then be associated with a point in multi-dimensional space (in this instance, a point in fifty-dimensional space) for later clustering and projecting into two-dimensional space for generating a model of the environment and/or determining where a user that utters speech resides within the model.

In some instances, the feature-generation component may analyze each piece of audio data 112 received from the devices 108 in the environment 102 for generating respective audio-data features. In this example, the feature-generation component 136 may generate five feature values for the different features, with two the sets of the values corresponding to the devices 108(4) and 108(5) being equal to zero, given that these devices did not "hear" the user speech 106 and, thus, did not generate or provide audio data to the remote system 110.

In some instances, the feature-generation component 136 may generate a feature that is based on SNR ratios are different frequency bands of the audio data. For example, for each of the audio data 112(1)-(3), the feature-generation component 136 may generate a feature indicative of both signal energy and noise energy at each of multiple different frequency bands. Given that user speech typically resides at certain frequency bands, audio data that includes user speech may include a relatively high SNR value at those particular bands as compared to audio data that has a larger amount of noise than speech. In order to generate value for this feature, for example, the feature-generation component 136 may determine for each of multiple frequency bands in the audio data, a signal energy in that frequency band corresponding to user speech as well as a signal energy in that frequency band corresponding to background noise.

In addition, the feature-generation component 136 may generate a two-dimensional feature indicative of the Spectro-temporal structured sparsity of each generated audio data. In general, this feature will indicate the amount of "edges" or transitions within a spectrogram of the audio data, with a greater number of edges along multiple frequencies within a limited amount of time and a lesser amount of energy across a greater amount of time representing a larger amount of near-field speech (that is, speech close to the device) as compared to typical background noise, distant speech, and/or reverberant speech. To generate a value for this feature for particular audio data, the feature-generation component 136 may first generate a spectrogram of the audio data. A spectrogram may comprise a visual representation of the spectrum of frequencies in the audio data as it changes over time. In some instances, the spectrogram may be created using one or more band-pass filters, via Fourier transform of the audio data, or in any other known manner.

After generating the spectrogram for particular audio data, the feature-generation component 136 may generate a first-order derivative of the spectrogram, which may represent an amount of transition between frequencies in the audio data. The feature-generation component 136 may thereafter determine an amount of edges represented in the first-order derivative over multiple frequencies, with the feature value for this feature representing or otherwise being based on this amount. In some instances, audio data representing speech may have a greater amount of edges in the first-order derivative over multiple frequencies and over a limited amount of as opposed to audio data corresponding to background noise. In addition, the amount of energy may be less over a greater amount of time. Thus, audio data corresponding to near-field speech may comprise a large number of connected regions of the derivative (represented by the edges) with relative sparse energy over time.

The feature-generation component 136 may further generate a feature value indicative of onset strength of signal energy within the audio data. That is, the feature-generation component 136 may analyze the audio data to detect increase in spectral energy in the time domain, with this increase typically being associated with user speech as opposed to background noise. In order to generate this features, the feature-generation component 136 may calculate a first-order derivative of the audio data and may analyze this first-order derivative to identity a degree of change in signal energy. This degree of change, or onset, may be stored as a feature value for use in generating a model of the user environment and/or localizing a user within such a model.

The feature-generation component 136 may also calculate a spectral flatness for given audio data, also described as a tonality coefficient or Wiener entropy. The spectral flatness may be measured in decibels or the like and may indicate the amount of peaks or resonant structure within particular audio data. While background noise typically has a high degree of spectral flatness (approaching the value of one), speech or other unique sound typically has a lower spectral flatness given the greater number of peaks in the spectrum.

In addition, the feature-generation component 136 may calculate a harmonic ratio of each piece of audio data for user in generating a model and/or localizing a speaking user within such a model. Given that speech typically includes more harmonic components as opposed to background noise, a relatively high harmonic ratio may be indicative of speech. In some instances, the feature-generation component 136 calculates an amount of harmonic components within the audio data as well as an amount of non-harmonic components, and generates a ratio expressing these values.

The feature-generation component 136 may additionally calculate a spectral centroid, spectral spread, and/or spectral roll-off associated with audio data for use in generating a model of a user environment and/or localizing a user within the model. In general, the spectral centroid may be analogized to a center of mass of the signal energy within particular audio data. Spectral spread, meanwhile, indicates a distribution of signal energy about the spectral centroid. In some instances, audio data that is indicative of user speech may include a relatively smaller amount of spectral spread as compared to audio data representing noise. In order to generate this feature value for given audio data, the feature-generation component 136 may calculate a first value corresponding to a spectral centroid of the data, may calculate a second value indicating a distribution of components of the audio data about the centroid, and may use both the first and second values to generate a feature value. While this example describes calculating a feature value based on the spectral centroid and spread, in other instances the feature-generation component 136 may additionally or alternatively generate such a feature value based on spectral roll-off, which may represent a particular frequency below which a threshold amount of signal energy resides.

While a few example audio-data features have been described, it is to be appreciated that additional or alternative audio-data features may be generated. Regardless, after the features-generation component 136 generates a set of audio-data feature values, context feature values, and/or user-centric features values, the feature-generation component 136 may provide these values to the model-generation component 130 in instances where the audio data is being used to generate a model of the user environment 102. In instances where the audio data is being used to localize the speaking user for the purpose of selecting a device to respond to the user, the feature-generation component 136 may provide the feature values to the user-localization component 146.

In order to generate a model of the user environment 102, the model-generation component 130 may receive feature-value sets associated with respective voice commands and may calculate individual points in multi-dimensional space using these values. For example, in the example from above where the feature-generation component 136 calculated ten feature values for each of the five devices in the user environment, the model-generation component 30 may use these fifty feature values to calculate a point in fifty-dimensional space. In order to generate the model, meanwhile, the feature-generation component 136 may provide a relatively large number of different feature-value sets to the model-generation component 130, which may calculate a multi-dimensional point for each of set.

After calculating the multi-dimensional points, with each point representing a corresponding user request, the model-generation component 130 may apply a clustering algorithm to the multi-dimensional points to generate clusters of points, with the number of clusters being equal to the number of devices within an environment (e.g., five in the illustrated example). In some instances, the model-generation component 130 may apply a k-means clustering algorithm to the multi-dimensional points to generate k number of clusters, with k being equal to the number of devices in the environment.

After clustering these multi-dimensional points into multi-dimensional clusters, these clusters may be reduced into two-dimensional space (e.g., two-dimensional Euclidian plane) to represent the user environment in which the devices reside. For example, the model-generation component 130 may perform linear discriminant analysis (LDA), principal component analysis (PCA), or the like, may be applied to the multi-dimensional clusters to reduce these clusters into a two-dimensional Euclidian plane. Of course, while example algorithms are described, it is to be appreciated that the model-generation component 130 may utilize any other algorithm for reducing the dimensionality of the clustered points.

The dimension-reduction algorithm, such as LDA, may be informed of the labels to the apply to the points. That is, the algorithm may be informed of the number of clusters into which the points are to be grouped in two-dimensional space, with this number corresponding to the number of user device sin the environment. The dimension-reduction algorithm may output labels for each of the points, with these labels indicating which cluster the point belongs to. As such, the dimension-reduction algorithm may be thought of as outputting a Voronoi diagram having k partitions (or "regions"), with each clustered point corresponding to the one of the partitions. That is, the output of the algorithm may comprise a two-dimensional map that comprises regions and associated boundaries, with each clustered point being assigned a label indicating which region the point belongs to. After the model-generation component 130 generates a model of the environment 102, the model-generation component 130 may associate each region of the map with a particular user device, such as one of the devices 108(1)-(5).

Subsequent to generation of this model (or "topology"), the user 104 may issue a voice command in the environment 102. For example, the user 104 may utter the speech 106 that includes a voice command to play certain music in the environment 102. In response, the feature-generation component 136 may generate a number of feature values based on the received audio data, contextual data, and/or user-centric data. For example, the feature-generation component 136 may generate ten feature values for each of the five devices 108(1)-(5) for the example total of fifty feature values.

Thereafter, the feature-generation component 136 may provide these values to the user-localization component 146, which may calculate a multi-dimensional point using the techniques discussed above and may reduce the value of this point into two-dimensional Euclidian space, such as via LDA, PCA, or any other linear reduction algorithm. The user-localization component 146 may then determine which region of the k number of regions of the model the point falls within and may provide this indication to the device-selection component 126. The device-selection component 126 may then associate the region with a particular device that resides within that region and may cause the selected device to respond to the user speech 106 (e.g., by playing the requested music).

As illustrated, the remote system may further include one or more network interfaces 148 to receive data, such as audio data 112, from devices. The network interface(s) 148 may include wired or wireless interfaces, such as a wireless or Wi-Fi network communications interface, an Ethernet communications interface, a cellular network communications interface, a Bluetooth communications interface, etc., for communications with the voice-enabled devices 108 over various types of networks 114, including wide-area network, local-area networks, private networks, public networks etc. In the case of a wireless communications interfaces, such interfaces may include radio transceivers and associated control circuits and logic for implementing appropriate communication protocols.

Figure 2:
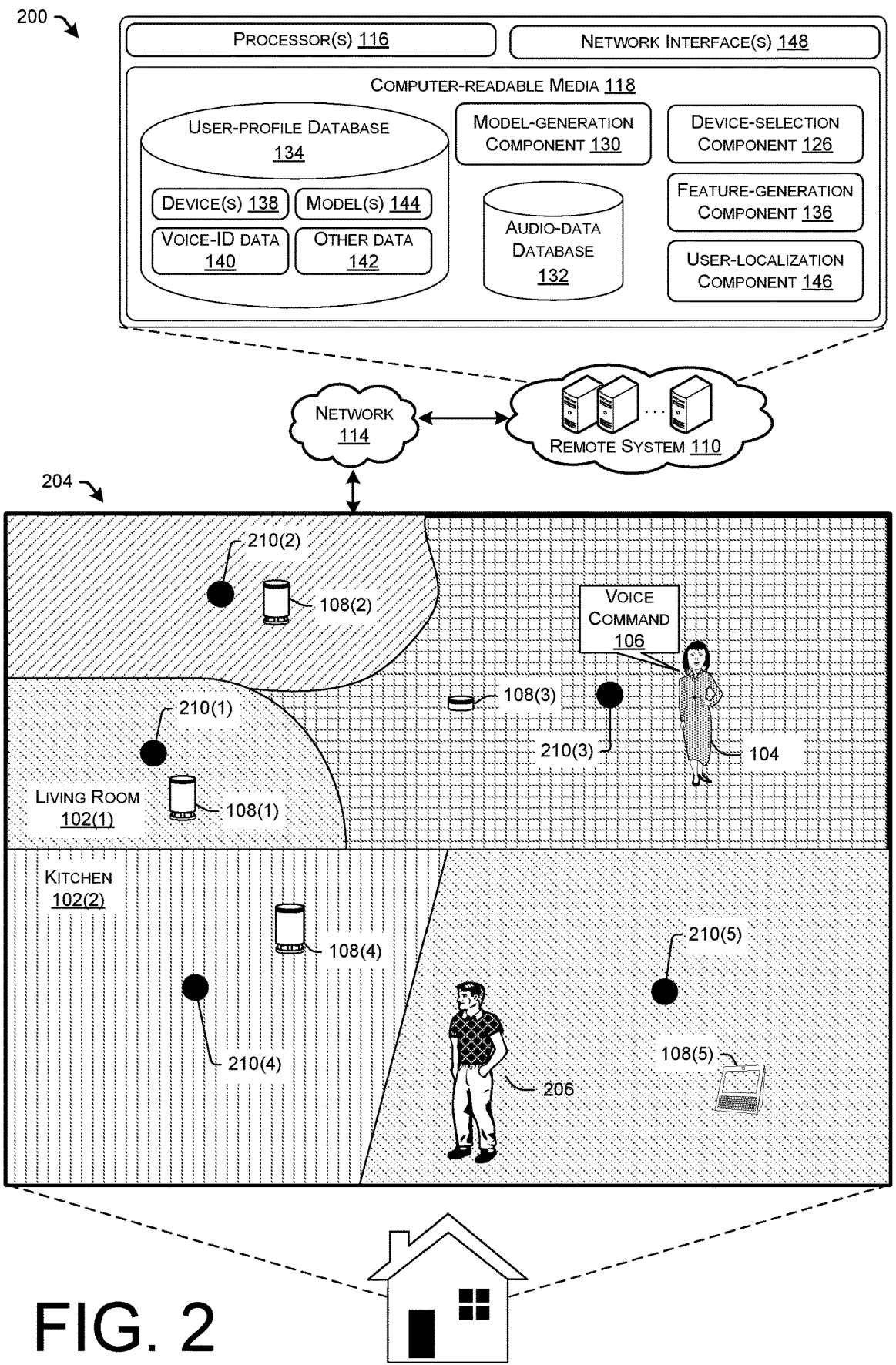
FIG. 2 illustrates a schematic diagram in which a remote system has generated a map of a user environment that includes regions, with each region associated with a voice-enabled device. In some instances, the remote system generates the map based on features associated with prior speech utterances. Upon receiving a new speech utterance, the remote system may determine features of the new utterance to determine a region in which the user associated with the utterance resides and may select the device associated with this region for responding to the utterance.

FIG. 2 illustrates a schematic diagram 200 in which the remote system 110 has generated an example map 204 of a user environment 102 that includes regions 210(1), (2), . . . , (5), with each region associated with a particular voice-enabled device 108(1)-(5). As described above, the remote system 110 may have generated the map 204 based on features associated with prior speech utterances. Upon receiving a new speech utterance, the remote system may determine features of the new utterance to determine a region in which the user associated with the utterance resides and may select the device associated with this region for responding to the utterance.

For example, after generating the map 204, envision that a user 206 provides a voice command. Upon receiving audio data indicative of this voice command from one or more of the five devices 108(1)-(5), the feature-generation component 136 may generate feature values associated with this request. Next, the user-localization component 146 may use these feature values to calculate a point in multi-dimensional space before using a linear-reduction algorithm to reduce this point to a point in two-dimensional space. The component 146 may then determine which partition of the illustrated Voronoi diagram the point belongs to. In this example, the point may correspond to the region 210(5) in which the user resides. The device-selection component 126 may then determine that the region 210(5) is associated with the device 108(5) and, thus, may instruct the device 108(5) to respond to the user request.

FIGS. 3A-3D collectively illustrate a flow diagram of an example process 300 for generating a map, such as the map shown in FIG. 2, and thereafter localizing a user for determining which device is to respond to an utterance of the user.

Each process described herein is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, the components of the remote system 110 described above may perform some or all of these operations. In other instances, some or all of the operations may be performed at local user devices or at a combination of the remote system and the user devices.

At an operation 302, the remote system 110 receives audio signals corresponding to user speech. In some instances, these audio signals are received during a training phase prior to the deployment of the devices into a user environment. In other instances, these audio signals are received while the devices are operating in the user environment. At an operation 304, the features-generation component 136 described above may generate a set of features associated with each user request of the audio signals. That is, each user request may be associated with multiple audio signals, depending on the number of devices that "heard" the request, and each request may be associated with a set of feature values determined by the feature-generation component 136.

The features determined by the feature-generation component 136 may comprise contextual features (e.g., time-of-day, geolocation, etc.), user-centric features (e.g., voice-ID of the user uttering the speech, etc.), and/or audio-data features. The latter may include features such as frequency-dependent S/N ratios (SNRs), Spectro-temporal structured sparsity, time-domain onset strength, spectral flatness, harmonic ratio, spectral centroid and spread, spectral roll-off, and/or the like.

After the feature-generation component 136 generates these feature values, at an operation 306 the model-generation component 130 may use these feature values to calculate respective multi-dimensional points. That is, given that each user request may be associated with a set of feature values, the model-generation component 130 may use these values to determine a point in multi-dimensional space corresponding to these values.

Figure 3A:
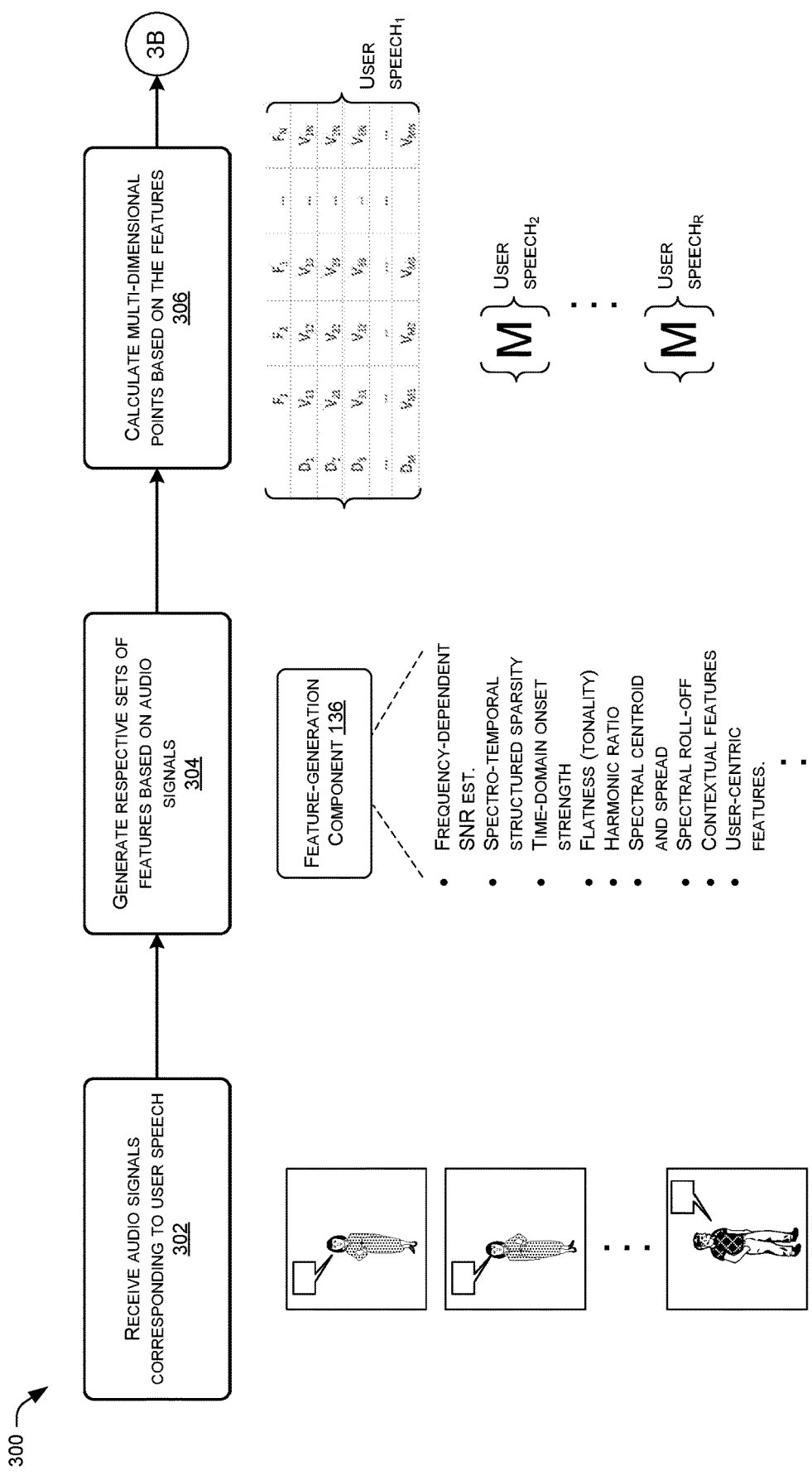
FIGS. 3A-3D collectively illustrate a flow diagram of an example process for generating a map, such as the map shown in FIG. 2, and thereafter localizing a user for determining which device is to respond to an utterance of the user.
Figure 3B:
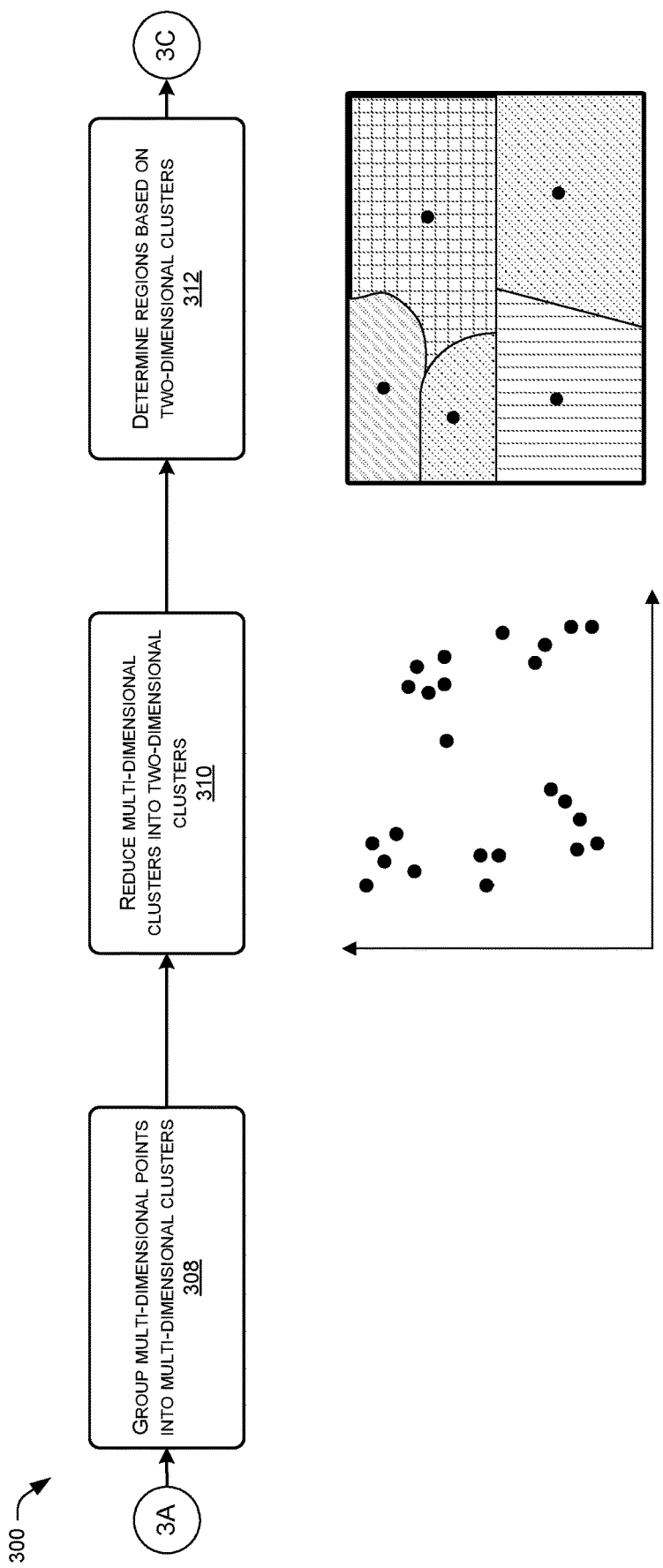

FIG. 3B continues the illustration of the process 300 and includes, at an operation 308, the model-generation component 130 grouping the multi-dimensional points into clusters. For example, the model-generation component 130 may use a k-means algorithm, with k being equal to the number of user devices associated with the environment, to generate a multi-dimensional model of the environment having k number of regions. At an operation 310, the model-generation component 130 then uses one or more linear-reduction algorithms (e.g., LDA, PCA, etc.) to reduce the clusters in multi-dimensional space to clusters in two-dimensional space, again having k number of regions. At an operation 312, the model-generation component 130 determines k number of regions (or "partitions") within the user environment as an output of the linear-reduction algorithm(s).

Figure 3C:
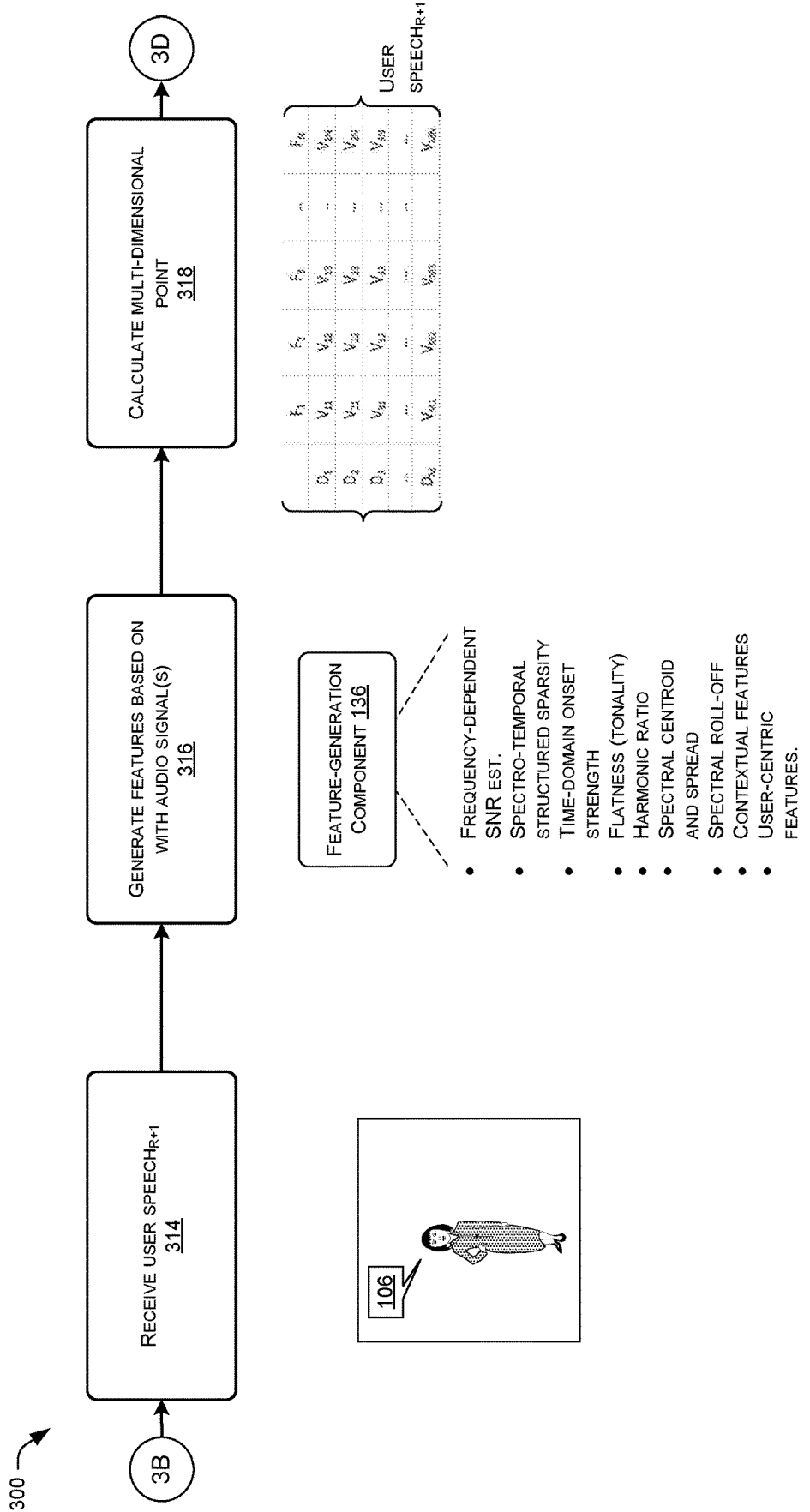

FIG. 3C continues the illustration and includes, at an operation 314, receiving a user request in the form of user speech. For instance, three of the five devices 108(1)-(5) in the environment 102 may provide audio data indicative of the user speech to the remote system 110. At an operation 316, the feature-generation component 136 may generate a set of feature values for the user speech based on the received audio data. Again, these features may comprise audio-data features, contextual features, user-centric features, and/or the like. At an operation 318, the user-localization component 146 may use the feature values to calculate a point in multi-dimensional space corresponding to the user speech.

Figure 3D:
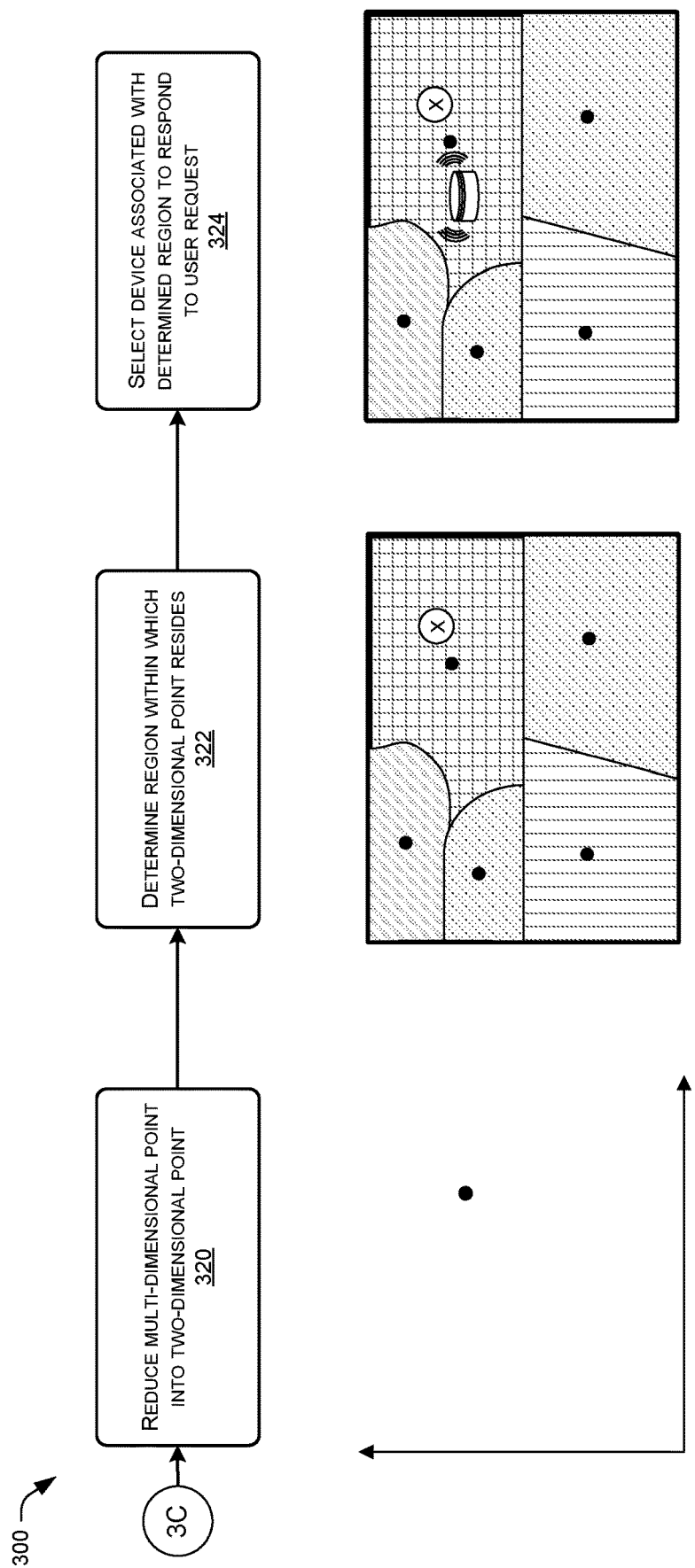

FIG. 3D concludes the illustration of the process 300 and includes, at an operation 320, using one or more linear-reduction algorithms to reduce the point in multi-dimensional space to a point in two-dimensional space. At an operation 322, the user-localization component 146 determines which of the k regions of the model the two-dimensional point belongs to. In some instances, this is determined as an outputted label from the linear-reduction techniques. At an operation 324, the device-selection component 126 determines which device is associated with this region and causes this device to respond to the user speech.

Figure 4:
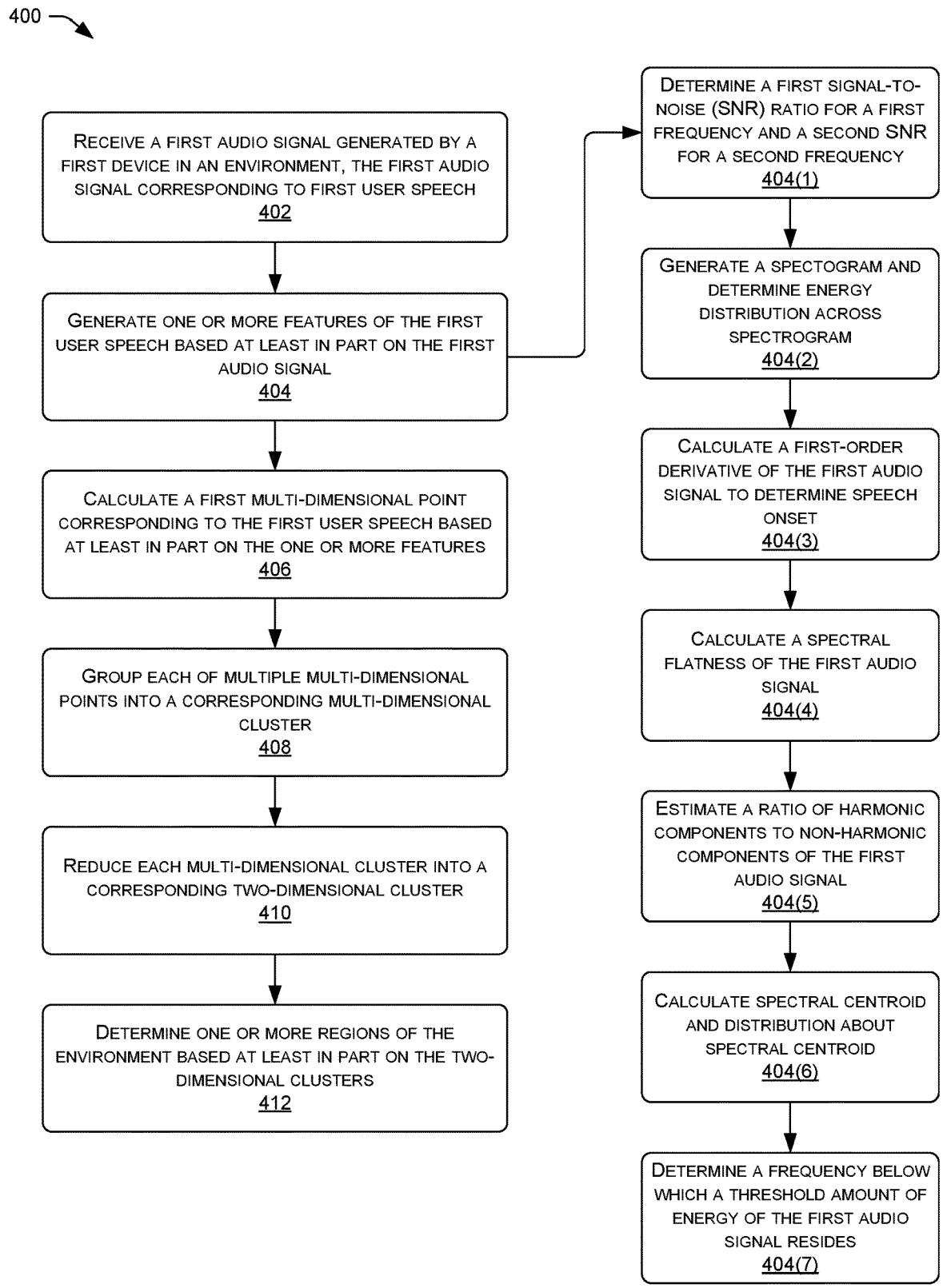
FIG. 4 illustrates a flow diagram of an example process for building a map of a user environment, with the map including multiple regions, each associated with a respective user device.

FIG. 4 illustrates a flow diagram of an example process 400 for building a map of a user environment, with the map including multiple regions, each associated with a respective user device. At an operation 402, the remote system 110 may receive a first audio signal generated by a first device in an environment, with this first audio signal representing first user speech. At an operation 404, the remote system 110 may generate one or more features of the first user speech based at least in part on the audio signal. For example, and as illustrated, this operation may include one or more of a series of sub-operations. A first sub-operation 404(1) represents determining a first SNR of the audio signal for a first frequency band and determining a second SNR of the audio signal for a second frequency band. As described above, this information may be useful to differentiate speech from background noise. A second sub-operation 404(2) represents generating a spectrogram and determining an energy distribution across this spectrogram. In some instances, this includes calculating a first-order derivative of the spectrogram and determining an amount of edges or transitions in the first order derivative. Next, a sub-operation 404(3) represents calculating a first-order derivative of the audio signal to determine onset of user speech in a time domain of the signal. Again, relatively high onset strength may be indicative of user speech as compare to low onset strength indicative of noise. A sub-operation 404(4), meanwhile, represents calculating a spectral flatness, or tonality coefficient, of the audio signal, while a sub-operation 404(5) represents estimating a harmonic ratio of the signal by calculating harmonic components of the audio signal and non-harmonic components. A sub-operation 404(6) represents calculating a spectral centroid and spread about the centroid, while a sub-operation 404(7) represents calculating a spectral roll-off by determining a frequency below which a threshold amount of signal energy resides. Of course, while a few example audio-data features are described, it is to be appreciated that other types of audio-features and non-audio-signal features may be used in generating the feature values.

At an operation 406, the remote system 110 may calculate a first multi-dimensional point based on the feature values. The remote system may perform the operations 402-406 for a plurality of user requests, such that a plurality of multi-dimensional points are generated. Thereafter, at an operation 408 the remote system may group the multi-dimensional points, including the first multi-dimensional point, into clusters using, for example, a k-means algorithm where k is set to the number of user devices in the environment. At an operation 410, the remote system 110 uses one or more linear-reduction algorithms to reduce the clusters from the multi-dimensional space into a two-dimensional space. For instance, LDA, PCA, or the like may be used to cluster the points in two space, with each point being labeled as residing in one of the k partitions of the two-dimensional space. At an operation 412, the remote system determines the k number of regions in the environment. For instance, the remote system 110 may store an indication of the relative coordinates of each region such that the points may later be assigned to individual regions for selecting devices to respond to user requests, as described below with reference to FIG. 5.

Figure 5:
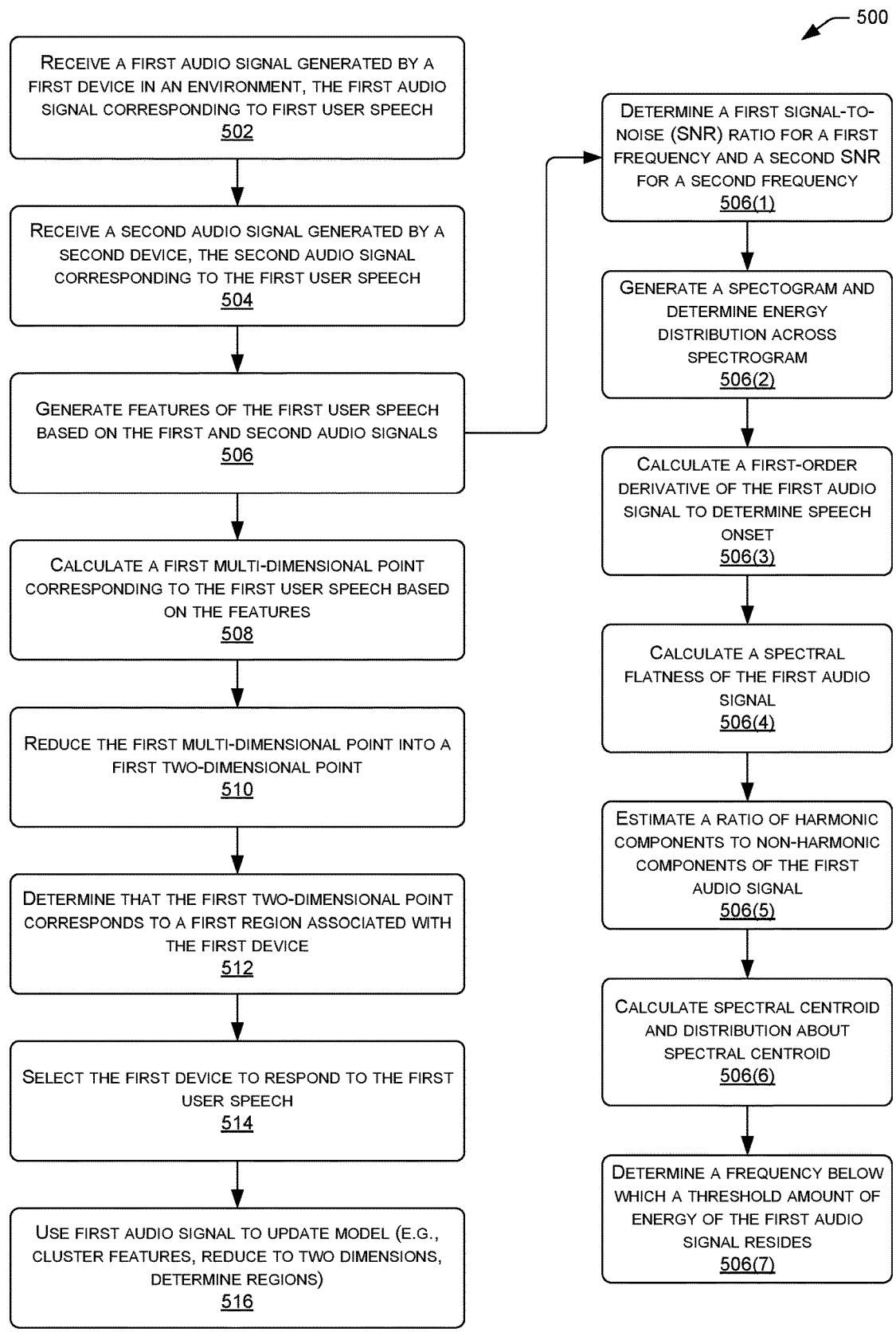
FIG. 5 illustrates a flow diagram of an example process for localizing a user within a map of a user environment for selecting a user device to respond to a user utterance of a user.

FIG. 5 illustrates a flow diagram of an example process 500 for localizing a user within a map of a user environment for selecting a user device to respond to a user utterance of a user. At an operation 502, the remote system receives a first audio signal generated by a first device in an environment, with the first audio signal corresponding to first user speech. At an operation 504, the remote system receives a second audio signal generated by a second device in the environment, with the second audio signal also corresponding to the first user speech. At an operation 506, the remote system 110 generates features of the first user speech based at least in part on the first and second audio signals.

Again, the operation 506 may include sub-operations 506(1)-(7). A first sub-operation 506(1) represents determining respective first SNRs of the respective audio signals for a first frequency band and determining respective second SNRs of the respective audio signals for a second frequency band. As described above, this information may be useful to differentiate speech from background noise. A second sub-operation 506(2) represents generating respective spectrograms and determining energy distributions across these spectrograms. In some instances, this includes calculating a first-order derivative of a spectrogram and determining an amount of edges or transitions in the first order derivative. Next, a sub-operation 5064(3) represents calculating first-order derivatives of the respective audio signals to determine onset of user speech in a time domain of the signals. Again, relatively high onset strength may be indicative of user speech as compare to low onset strength indicative of noise. A sub-operation 506(4), meanwhile, represents calculating a spectral flatness, or tonality coefficient, of each of the audio signals, while a sub-operation 504(5) represents estimating a harmonic ratio of each signal by calculating harmonic components of the audio signal and non-harmonic components. A sub-operation 506(6) represents calculating a spectral centroid and spread about the centroid for each audio signal, while a sub-operation 506(7) represents calculating a spectral roll-off for each signal by determining a frequency below which a threshold amount of signal energy resides. Again, while a few example audio-data features are described, it is to be appreciated that other types of audio-features and non-audio-signal features may be used in generating the feature values.

At an operation 508, the remote system 110 calculates a first multi-dimensional point corresponding to the first user speech based on the generated feature values. At an operation 510, the remote system 110 then uses a linear-reduction algorithm to reduce the first multi-dimensional point to a first two-dimensional point. At an operation 512, the remote system 110 determines that the first two-dimensional point corresponds to a particular region of the k regions in the model of the environment. Thereafter, at an operation 514, the remote system 110 selects the device associated with the identified region to respond to the user speech. Finally, at an operation 516, the remote system may use the received audio signals, the features generated therefrom, and the selected region to update the model of the user environment.

Figure 6A:
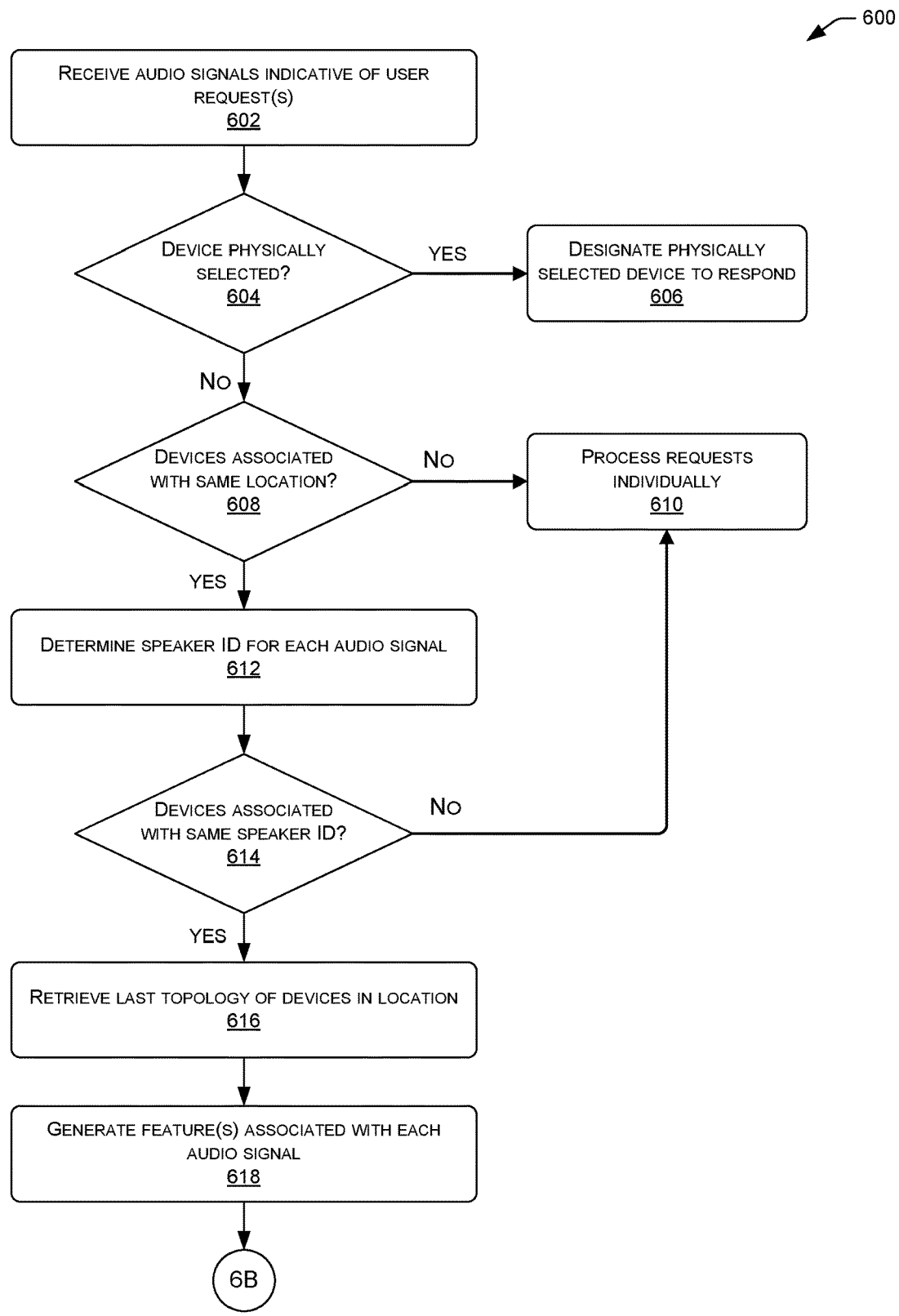
FIGS. 6A-B collectively illustrate a flow diagram for iteratively generating a map of a user environment, with each region of the map being associated with a respective user device.
Figure 6B:
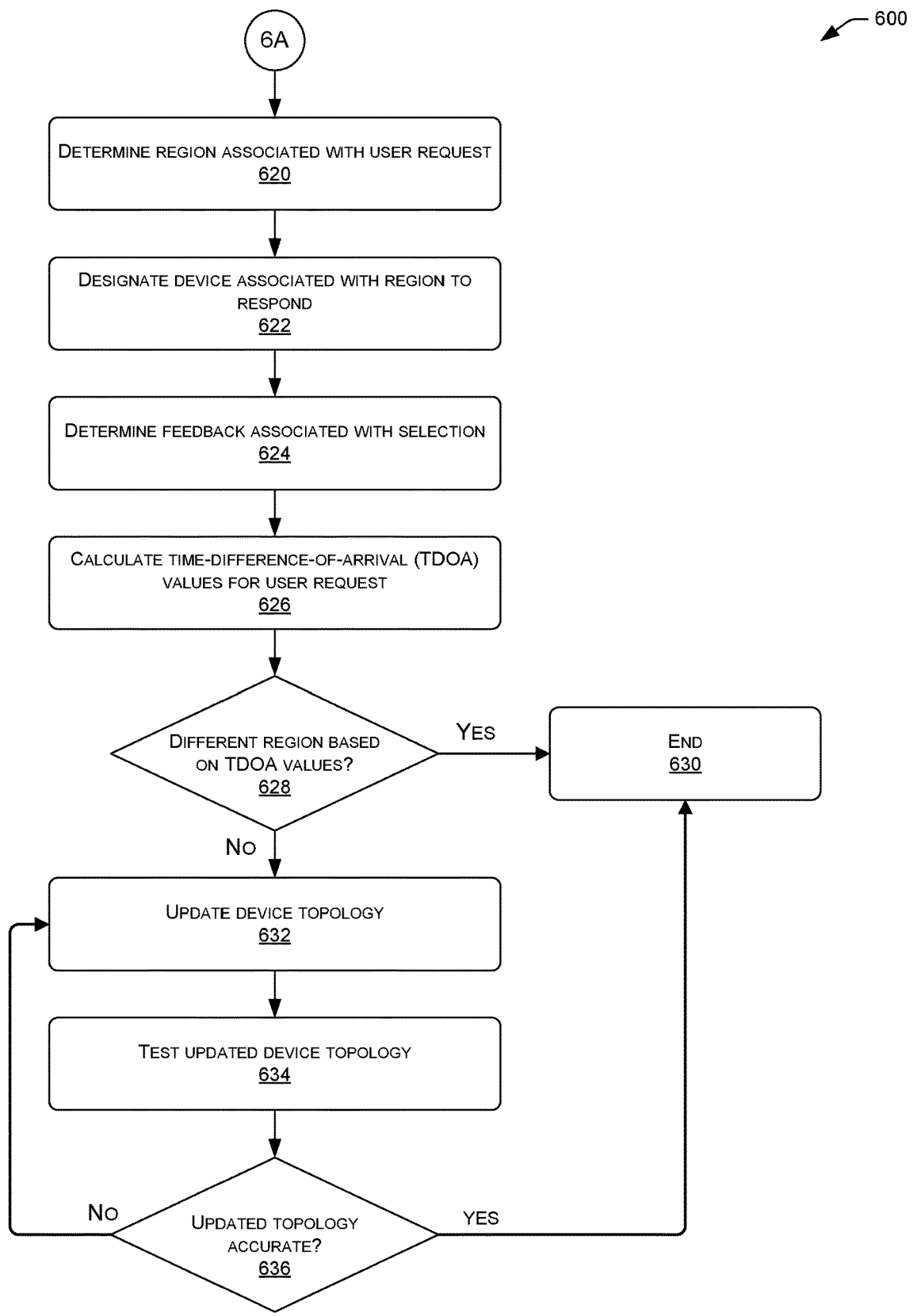

FIGS. 6A-B collectively illustrate a flow diagram of an example process 600 for iteratively generating a map of a user environment, with each region of the map being associated with a respective user device. At an operation 602, the remote system 110 may receive one or more audio signals indicative of a user request. At an operation 604, the remote system 110 determines whether a device was physically selected for responding to the user request. For instance, a user may have selected a button on a device and thereafter provided the audio signal. If so, then at an operation 606, the remote system designates the selected device to respond to the user request. If not, however, then the remote system 110 may proceed to determine at an operation 608 whether each received audio signal is associated with a common location. For example, a user's house or building may include multiple levels, rooms, or the like, and each of these locations may be associated with different models of the respective environment. Therefore, if the received audio signals are associated with different locations (e.g., a first signal is from a first floor of a building and a second signal is from a second floor of the building), then at an operation 610 the remote system 110 may process the audio signals independently.

If the location is the same, however, then at an operation 612 the remote system 110 may determine an identity of the speaker of each audio signal. For instance, the remote system 110 may compare certain features of each audio signal to voice-ID data stored at the remote system. At an operation 614, the remote system determines whether the speaker IDs are the same for each of the audio signals. If not, then the remote system 110 may process the audio signals independently. If, however, each audio signal is associated with a common speaker ID, then at an operation 616 the remote system may retrieve a current topology of the user environment. At an operation 618, the remote system 110 generates one or more features of the audio signals as described above.

FIG. 6B continues the illustration of the process 600 and includes, at an operation 620, using the feature values to determine a region of the environment associated with the user request, as described above. At an operation 622, the remote system 110 designates the device associated with the identified region to respond to the user request. At an operation 624, the remote system 110 may receive feedback corresponding to the device selection. The feedback may include explicit feedback, such as the user again stating the request, indicating on a mobile application that the remote system 110 did not select the appropriate device, or the like. In other instances, the feedback may comprise implicit feedback, such as the user refraining from again stating the request or otherwise providing explicit feedback, indicating that the remote system 110 selected the appropriate device.

At an operation 626, the remote system 110 may also calculate time-difference-of-arrival (TDOA) values associated with the request at each of the devices in the environment and may use these TDOA values for localizing the user. That is, in addition to using the localization techniques described above with reference to FIGS. 1-5, the remote system 110 may also localize the user using TDOA techniques. At an operation 628, the remote system 110 may then determine whether the region of the user determined by the TDOA techniques is the same region as that determined at the operation 620. If so, then the TDOA values may be deemed to have validated the initial determination and the process may end at an operation 630. If not, however, then at an operation 632 the remote system 110 may update the topology of the user environment using the TDOA result. For instance, the remote system 110 may indicate that the region determined at the operation 620 was incorrect and that the region determined via the TDOA values was the correct region, and the topology may be re-trained based on this information.

At an operation 634, the remote system 110 may then test the updated topology. For instance, the remote system 110 may select a sample of previous user requests and may apply the updated topology to the data associated with these user requests. At an operation 636, the remote system 110 may determine whether the updated topology is accurate, that is, whether the updated topology is used to localize users at an accuracy rate that is greater than a threshold. If so, then the process ends at the operation 630. If not, however, then the process 600 may proceed to iteratively update the topology at the operation 632 until the accuracy converges to greater than the threshold.

Figure 7:
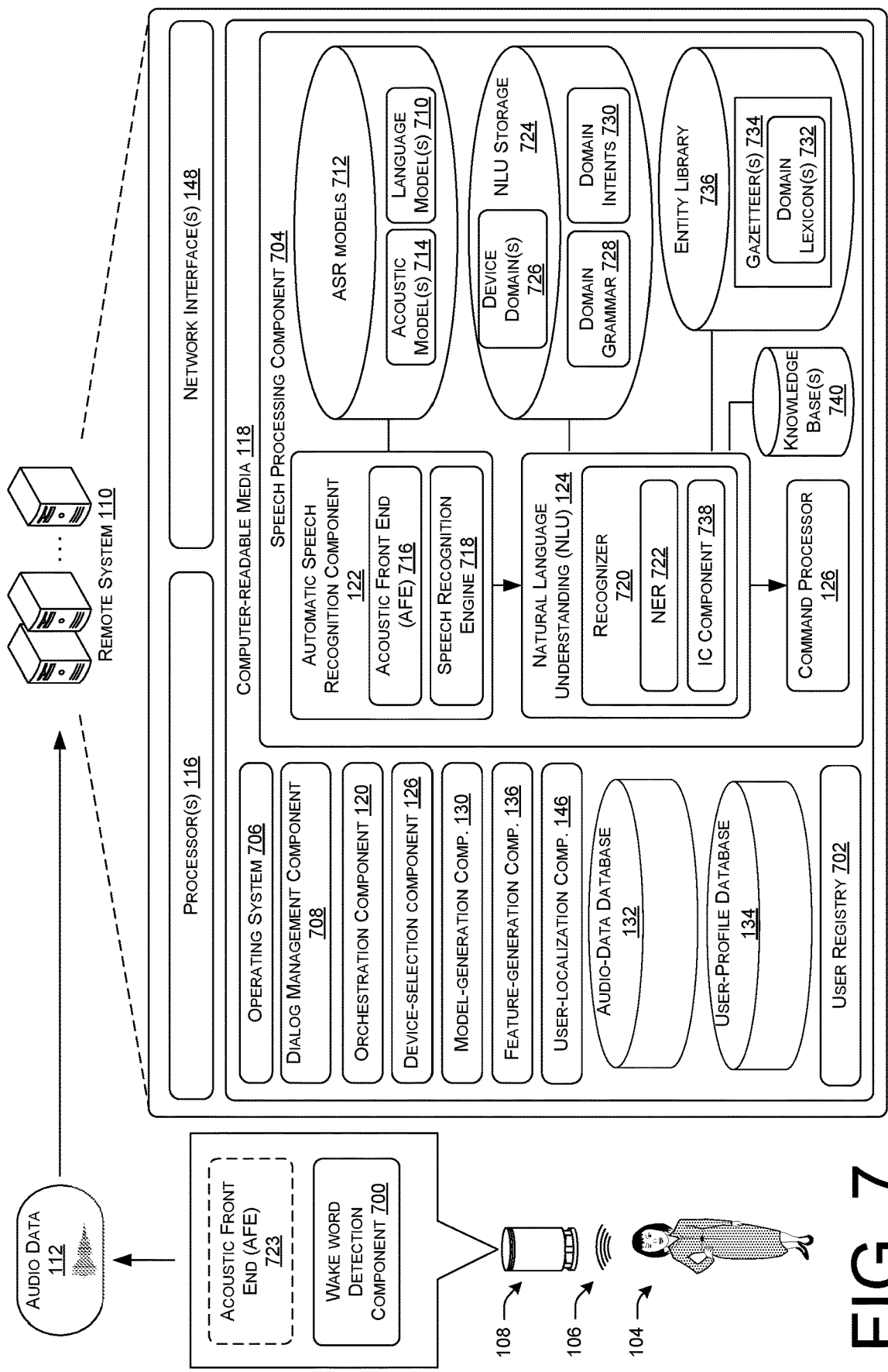
FIG. 7 illustrates a block diagram of an example architecture of a speech processing system which receives audio data from voice-enabled devices, generates maps of user environments, and uses the generated maps for determining which voice-enabled devices are to respond to speech utterances of users in the environments.

FIG. 7 illustrates a block diagram of an example architecture of a speech processing system (e.g., remote system 110) which receives audio data 112 from voice-enabled devices 108, and performs techniques to determine which of the voice-enabled devices is to respond to a speech utterance of a user represented in the audio signal.

FIG. 7 illustrates a block diagram of an example architecture of a remote system 110 which receives audio data 112 and metadata from voice-enabled devices 108, and performs processing techniques to determine which of the voice-enabled devices 108 is to respond to a voice command associated of a user 104 represented in the audio data 112.

FIG. 7 includes a conceptual diagram of how a voice command can be processed, allowing a system to capture and execute commands spoken by a user 104, such as spoken commands that may follow a wakeword. The various components illustrated may be located on a same or different physical devices. Communication between various components illustrated in FIG. 7 may occur directly or across a network 114. An audio capture component, such as a microphone of voice-enabled device 108, captures audio corresponding to speech 106 that includes a voice command. The voice-enabled device 108, using a wakeword detection component 700, then processes the voice command, or audio data corresponding to the voice command, to determine if a keyword (such as a wakeword) is detected in the voice command. Following detection of a wakeword, the voice-enabled device 108 sends an audio data 112 corresponding to the voice command, to a computing device of the remote system 110 that includes the ASR component 122. The audio data 112 may be output from an acoustic front end (AFE) 723 located on the voice-enabled device 108 prior to transmission. Or, the audio data 112 may be in a different form for processing by a remote AFE 716, such as the AFE 716 located with the ASR component 122.

In various examples, the remote system 110 may include one or more processors 116 to power components, devices, and actions of the remote system 110, and one or more network interfaces 148 such as a wireless or Wi-Fi network communications interface, an Ethernet communications interface, a cellular network communications interface, a Bluetooth communications interface, etc., for communications by the remote system 110 over various types of networks 114, including wide-area network, local-area networks, private networks, public networks etc. In the case of a wireless communications interfaces, such interfaces may include radio transceivers and associated control circuits and logic for implementing appropriate communication protocols.

The remote system 110 may further include computer-readable media 118 which stores various components, components, or other executable software to perform various arbitration actions to determine which voice-enabled device 108 is to respond to a command in the voice command. The computer-readable media 118 may store an operating system 706 that is configured to manage hardware and services within and coupled to the remote system 110.

The computer-readable media 118 may further store a dialog management component 708 that is responsible for conducting speech dialogs with the user 104 in response to meanings or intents of user speech determined by the NLU component 124. The dialog management component 708 may include domain logic that is used to analyze the meaning of user speech and to determine how to respond to the user speech. The dialog management component 708 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

In some examples, audio data (e.g., audio data 112) may be received by the remote system 110 for speech processing for interpretation of the included voice command (either for purposes of enabling voice-communications and/or for purposes of executing a command in the speech). The audio data may include data corresponding to the wakeword, or the portion of the audio data corresponding to the wakeword may be removed by the voice-enabled device 108 prior to sending. Upon receipt by the remote system 110, the ASR component 122 may convert the audio data into text. The ASR component 122 transcribes audio data into text data representing the words of the speech contained in the audio data. The text data may then be used by other components for various purposes, such as arbitration, executing system commands, inputting data, etc. A voice command in the audio data is input to a processor configured to perform ASR which then interprets the utterance based on the similarity between the utterance and pre-established ASR language models stored in an ASR model knowledge base (ASR Models Storage 712). For example, the ASR process may compare the input audio data with models for sounds (e.g., subword units or phonemes) and sequences of sounds to identify words that match the sequence of sounds spoken in the utterance of the audio data.

The different ways a voice command may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 714 stored in an ASR Models Storage 712), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 122 outputs the most likely text recognized in the audio data.

The ASR component 122 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 716 and a speech recognition engine 718. The acoustic front end (AFE) 716 transforms the audio data from the microphone into data for processing by the speech recognition engine 718. The speech recognition engine 718 compares the speech recognition data with acoustic models 714, language models 710, and other data models and information for recognizing the speech conveyed in the audio data. The AFE 716 may reduce noise in the audio data and divide the digitized audio data into frames representing time intervals for which the AFE 716 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 716 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 718 may process the output from the AFE 716 with reference to information stored in speech/model storage (712). Alternatively, post front-end processed data (such as feature vectors) may be received by the device executing ASR processing from another source besides the internal AFE 716. For example, the voice-enabled device 108 may process audio data into feature vectors (for example using an on-device AFE 716) and transmit that information to a server across a network for ASR processing. Feature vectors may arrive at the remote system 110 encoded, in which case they may be decoded prior to processing by the processor executing the speech recognition engine 718.

The speech recognition engine 718 attempts to match received feature vectors to language phonemes and words as known in the stored acoustic models 714 and language models 710. The speech recognition engine 718 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 718 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 718 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The NLU component 124 (e.g., server) may include various components, including potentially dedicated processor(s), memory, storage, etc. As shown in FIG. 7, the NLU component 124 may include a recognizer 720 that includes a named entity recognition (NER) component 722 which is used to identify portions of query text that correspond to a named entity that may be recognizable by the system. A downstream process called named entity resolution links a text portion to a specific entity known to the system. To perform named entity resolution, the system may utilize gazetteer information 734 stored in entity library storage 736. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 124 takes textual input (such as the textual input determined by the ASR component 122) and attempts to make a semantic interpretation of the text. That is, the NLU component 124 determines the meaning behind the text based on the individual words and then implements that meaning. NLU component 124 interprets a text string to derive an intent or a desired action from the user as well as the pertinent pieces of information in the text that allow a device (e.g., voice-enabled device 108) to complete that action. For example, if a spoken utterance is processed using ASR component 122 and outputs the text "turn off the alarm" the NLU component 124 may determine that the user 104 intended that the voice-enabled device 108(2) be instructed to turn off an alarm sound being output. As another example, if the spoken utterance is processed using ASR component 122 and outputs the text "hang up the phone" the NLU component 124 may determine that the user 104 intended that the voice-enabled device 108(2) be instructed to hang up a phone through which a phone call is being performed.

The NLU component 124 may process several textual inputs related to the same utterance. For example, if the ASR component 122 outputs N text segments (as part of an N-best list), the NLU component 124 may process all N outputs to obtain NLU results.

To correctly perform NLU processing of speech input, the NLU component 124 may be configured to determine a "domain" of the utterance so as to determine and narrow down which services offered by the endpoint device (e.g., remote system 110 or the voice-enabled device 108) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 722 receives a query in the form of ASR results and attempts to identify relevant grammars and lexical information that may be used to construe meaning. To do so, the NLU component 124 may begin by identifying potential domains that may relate to the received query. The NLU storage 724 includes a database of devices domains 726 which identify domains associated with specific devices. For example, the voice-enabled device 108 may be associated with domains for music, telephony, calendaring, contact lists, and device-specific communications, but not video. In addition, the device domains 726 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 720, language model and/or grammar databases 728, a particular set of domain intents/actions 730, and a particular personalized domain lexicon 732. Each gazetteer 734 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 738 parses the query to determine an intent or intents for each identified domain, where the intent corresponds to the action to be performed that is responsive to the query. Each domain is associated with a database (e.g., domain intents 730) of words linked to intents. For example, a music domain intent database 730 may link words and phrases such as "quiet," "volume off," and "mute" to a "mute" intent. A voice-message domain intent database, meanwhile, may link words and phrases such as "send a message," "send a voice message," "send the following," or the like. The IC component 738 identifies potential intents for each identified domain by comparing words in the query to the words and phrases in the domain intents database 730. In some instances, the determination of an intent by the IC component 738 is performed using a set of rules or templates that are processed against the incoming text to identify a matching intent.

In order to generate a particular interpreted response, the NER 722 applies the grammar models and lexical information associated with the respective domain to actually recognize a mention one or more entities in the text of the query. In this manner, the NER component 722 identifies "slots" (i.e., particular words in query text) that may be needed for later command processing. Depending on the complexity of the NER component 722, it may also label each slot with a type of varying levels of specificity (such as noun, place, city, artist name, song name, or the like). Each grammar model 728 includes the names of entities (i.e., nouns) commonly found in speech about the particular domain (i.e., generic terms), whereas the lexical information 732 from the gazetteer 734 is personalized to the user(s) and/or the device. For instance, a grammar model associated with the shopping domain may include a database of words commonly used when people discuss shopping.

The intents identified by the IC component 738 are linked to domain-specific grammar frameworks (included in 730) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (728) framework or frameworks may correspond to sentence structures such as "Send a message to {contact}," "Send a voice message to {contact}," "Send the following to {contact}," etc.

For example, the NER component 722 may parse the query to identify words as subject, object, verb, preposition, etc., based on grammar rules and/or models, prior to recognizing named entities. The identified verb may be used by the IC component 738 to identify intent, which is then used by the NER component 722 to identify frameworks. A framework for the intent of "send a message," meanwhile, may specify a list of slots/fields applicable to play the identified "contact" and any object modifier (e.g., specifying a device of the recipient) or the like. The NER component 722 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 722 may search the database of generic words associated with the domain (in the knowledge base 740). So, for instance, if the query was "send message to Joe," after failing to determine a last name for "Joe," the NER component 722 may search the domain vocabulary for the word "Joe." In the alternative, generic words may be checked before the gazetteer information, or both may be tried, potentially producing two different results.

The output data from the NLU component 124 (which may include tagged text, commands, etc.) may then be sent to the command processor 128. The destination command processor 128 may be determined based on the NLU output. For example, if the NLU output includes a command to send a message, the destination command processor 128 may be a message sending application, such as one located on the user device or in a message sending appliance, configured to execute a message sending command. If the NLU output includes a search request, the destination command processor 128 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 124 during runtime operations where NLU operations are performed on text (such as text output from an ASR component 122). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 720. Each recognizer may include various NLU components such as an NER component 722, IC component 738 and other components such as an entity resolver, or other components.

As noted above, multiple devices may be employed in a single remote system 110. In such a multi-device system, each of the devices may include different components for performing different aspects of the speech processing. The multiple devices may include overlapping components. The components of the voice-enabled device 108 and the remote system 110, as illustrated herein are exemplary, and may be located in a stand-alone device or may be included, in whole or in part, as a component of a larger device or system, may be distributed across a network or multiple devices connected by a network, etc.

Figure 8:
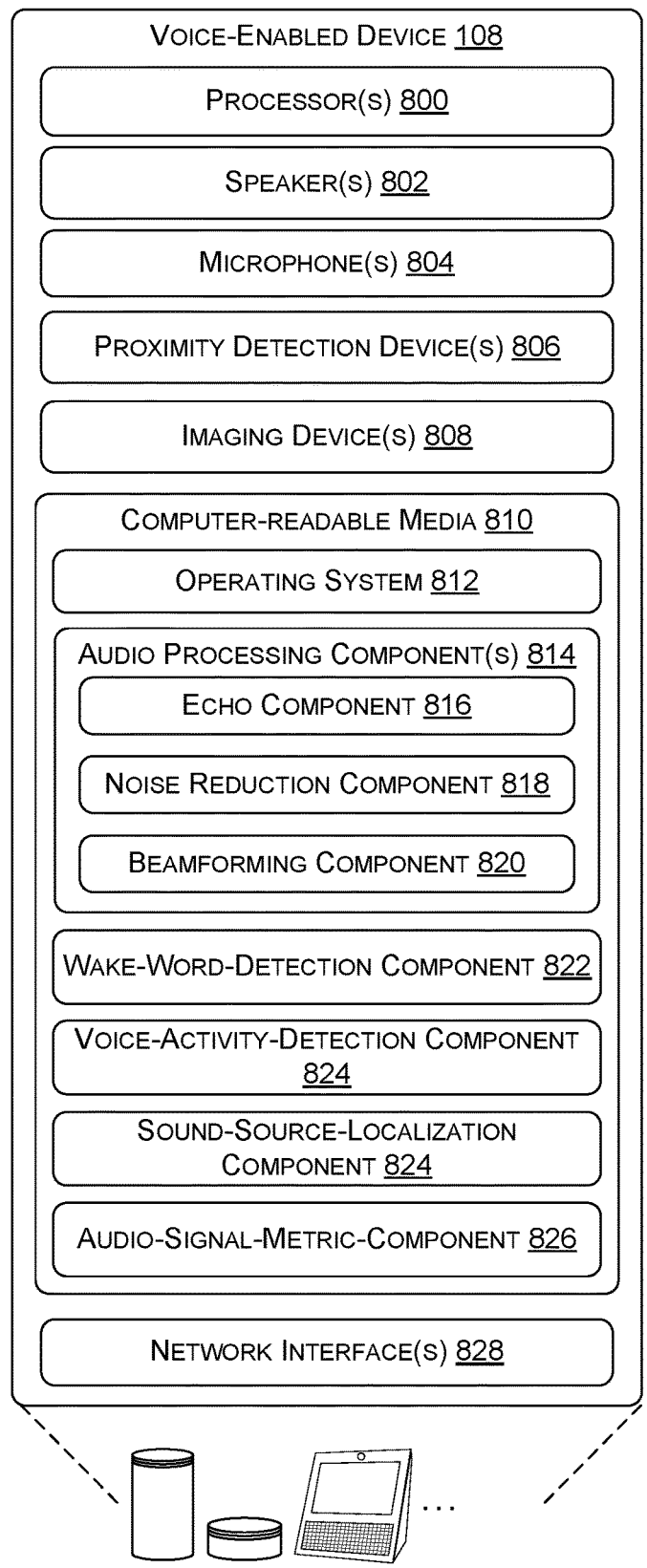
FIG. 8 illustrates a block diagram of example components of voice-enabled devices configured to interface with the speech processing system of FIG. 7.

FIG. 8 illustrates a block diagram of an example architecture of a voice-enabled device 108 that generates audio data 112 and metadata, and sends the audio data 112 and metadata to a remote system 110.

The voice-enabled device includes one or more processors 800, one or more speakers 802, and one or more microphones 804. The processors 800 may include a central processing unit (CPU), a graphics processing unit (GPU), a microprocessor, a digital signal processor, and so on. Although not illustrated, the voice-enabled device 108 may also include one or more input/output devices (e.g., mouse, keyboard, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the voice-enabled device 108 may be used to receive input from a user and/or to output a response.

Although the voice-enabled device 108 is illustrated as having one or more integral speakers 802, in other embodiments the voice-enabled device 108 may not include speakers 802. For example, the voice-enabled device 108 may comprise a microphone device into which a user speaks to issue commands or may comprise a device for connection to another appliance such as a television. Instead of integrated speakers 802, embodiments such as this may use loudspeaker capabilities of other devices, including other voice-enabled devices that do have loudspeakers and different types of dedicated loudspeaker components. As one example, the voice-enabled device 108 may produce an audio output signal that drives an external loudspeaker. As another example, the voice-enabled device 108 may drive or control an external loudspeaker through a wireless data connection such as a Bluetooth connection. In other situations, the voice-enabled device 108 may be used in conjunction with a loudspeaker device that receives audio signals and other instructions from the speech processing system 110, rather than from the voice-enabled device 108.

The microphones 804 may include sensors (e.g., transducers) configured to receive sound. The microphones 804 may generate input signals for audio input (e.g., sound). For example, the microphones 804 may determine digital input signals for an utterance of a user. In some instances, the microphones 804 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 804 may be in a planar configuration, or positioned apart in a non-planar three-dimensional region. In some implementations, the microphones 804 may include a spatially disparate array of sensors in data communication. For example, a networked array of sensors may be included. The microphones 804 may include omni-directional microphones, directional microphones (e.g., shotgun microphones), and so on.

In some examples, the microphones 804 and the speakers 802 facilitate interactions, such as dialogue, with user 104. The microphones 804 produce audio signals representing sound from the environment of the voice-enabled device 108, such as voice commands by the user 104. The audio signals produced by the microphones 804 may comprise directional audio signals or may be used to produce directional audio signals, where each of the directional audio signals emphasizes audio from a different radial direction relative to the microphones 804.

The processors 800 of the voice-enabled device 108 may be coupled to the components of the voice-enabled device 108 to cause the voice-enabled device 108 to perform various actions or operations. In some examples, the voice-enabled device 108 may include one or more proximity detection devices 806, such as a camera, a ranging device, or other sensor that is used to determine the portion of the user 104 relative to the voice-enabled device 108, and generate corresponding proximity or distance data. This proximity or distance data may be used as metadata for purposes of arbitration.

The voice-enabled device 108 may also include imaging devices 808 which take images of the environment 102 of the user 104. For instance, upon detecting a wakeword or other wake event, the voice-enabled device 108 may collect image data using the imaging devices 808. The imaging devices may include a camera, thermal imaging device, or any other type of imaging device 808 to capture images of the environment 102. The imaging devices 808 may generate image data, which in turn may be used as metadata for purposes of arbitration.

The voice-enabled device 108 may include computer-readable media 810. The computer-readable media 810 may be used to store any number of software components that are executable by the processors 800. Software components stored in the computer-readable media 810 may include an operating system 812 that is configured to manage hardware and services within and coupled to the voice-enabled device 108. In addition, executable components stored by the computer-readable media 810 may include audio processing components 814 configured to produce an audio signal using the microphones 804. The audio processing components 814 may include functionality for processing microphone audio signals generated by the microphones 804 and/or output audio signals provided to the speakers 802. As an example, the audio processing components 814 may include an acoustic echo cancellation or suppression component 816 for reducing acoustic echo generated by acoustic coupling between the microphones 804 and the speaker 802. The audio processing components 814 may also include a noise reduction component 818 for reducing noise in received audio signals, such as elements of microphone audio signals other than user speech.

The audio processing components 814 may include one or more audio beamformers or beamforming components 820 configured to generate directional audio signals that are focused in different directions. More specifically, the beamforming components 820 may be responsive to audio signals from spatially separated microphone elements of the microphones 804 to produce directional audio signals that emphasize sounds originating from different areas of the environment of the voice-enabled device 108 or from different directions relative to the voice-enabled device 108. The beamforming components 820 may in some cases produce audio signal metric values that may be used in arbitration. For example, the beamforming components 820 may indicate a signal strength of voice activity level corresponding to each directional audio signal.

Executable components stored in the computer-readable media 810 and executed by the processors 800 may include a wake word detection component 822 that monitors one or more of the directional audio signals to detect user utterances of the system of the trigger expression. As described above, wakeword detection may be implemented using keyword spotting technology, as an example.

The software components may also include a voice activity detection component 824 configured to monitor levels of voice presence in the directional audio signals produced by the beamforming component 820. Levels of voice presence may be used as am audio signal metric value for purposes of arbitration. In some examples, the voice activity may include an indication of the signal strength of the speech utterance and an indication of ambient noise in the environment 102. For instance, the voice activity may be a ratio of the signal strength of the speech utterance in an audio data 112 with the ambient noise in the audio data 112.

Software components of the voice-enabled device 108 may also include a sound source localization (SSL) component 824 that may be used to determine the distance of the user 104 from the voice-enabled device 108. The SSL component 824 is configured to analyze differences in arrival times of received sound at the respective microphones of the microphones 804 in order to determine the position from which the received sound originated. For example, the SSL component 824 may use time-difference-of-arrival (TDOA) techniques to determine the position or direction of a sound source. The determined position may be used as an audio signal metric value for purpose of performing arbitration as described herein.

The voice-enabled device 108 also has various hardware components, not shown, such as communication components, power components, I/O components, signal processing components indicators, control buttons, amplifiers, etc. For instance, rather than receiving a "wake-word" to wake up, a voice-enabled device 108 instead begin listening in response to a user 104 pressing a button on the device 108.

The voice-enabled device 108 may have one or more network interfaces 828 such as a wireless or Wi-Fi network communications interface, an Ethernet communications interface, a cellular network communications interface, a Bluetooth communications interface, etc., for communications with the speech processing system over various types of networks 114, including wide-area network, local-area networks, private networks, public networks etc. In the case of a wireless communications interfaces, such interfaces may include radio transceivers and associated control circuits and logic for implementing appropriate communication protocols.

In some examples, the audio signal metric component 826 may determine an audio signal metric value for each of a plurality of audio signals 112 (e.g., beamformed audio signals) provided by the beamformer component 820. While in this example these components are shown as being determined at the device 108, in other instances the remote system 110 may determine these values.

In some embodiments, each audio signal metric value is determined based on the samples of one of a plurality of frames of a beamformed audio signal. For example, a signal-to-noise ratio may be determined for a plurality of frames for each of the plurality of beamformed audio signals.

The audio signal metric values f may be determined for each of the plurality of beamformed audio signals for each frame, resulting in an array of numbers in the form f(n)(k):
 {f(1)(k), f(2)(k), . . . , f(N)(k)}
Here, "k" is the time index and "n" is the audio stream index (or look direction index) corresponding to the nth beamformed audio signal.

An audio signal metric value may include a signal-to-noise ratio (SNR), a level of voice presence in the audio data 112, a spectral centroid measure (e.g., a peak spectral centroid measure), a speech energy level (e.g., a 4 Hz modulation energy), a spectral flux, a particular percentile frequency (e.g., a $90^{th}$ percentile frequency), a periodicity, a clarity, a harmonicity, and so on. A spectral centroid measure generally provides a measure for a centroid mass of a spectrum. A spectral flux generally provides a measure for a rate of spectral change. A particular percentile frequency generally provides a measure based on a minimum frequency bin that covers at least a particular percentage (e.g., 90%) of the total power. A periodicity generally provides a measure that may be used for pitch detection in noisy environments. Clarity generally provides a measure that has a high value for voiced segments and a low value for background noise. Harmonicity is another measure that generally provides a high value for voiced segments and a low value for background noise. A speech energy level (e.g., 4 Hz modulation energy) generally provides a measure that has a high value for speech due to a speaking rate. In other embodiments, any another audio signal metric value may be determined that is some function of raw beamformed signal data over a brief time window (e.g., typically not more than one frame). In some instances, an audio signal metric value may be determined based on samples of a plurality of frames of a beamformed audio signal. Further, in some instances an audio signal metric value may be referred to as a signal feature.

In some instances, the audio signal metric component 826 may determine an audio signal metric value with respect to a particular beamformed audio signal. As one example, an SNR value may be determined for a beamformed audio signal that is associated with a particular look direction. In other instances, an audio signal metric value may be determined for multiple beamformed audio signals. As one example, an average audio signal metric value may be determined for a plurality of beamformed audio signals that are determined for a voice-enabled device, such as an average SNR value across any number of beamformed audio signals for the voice-enabled device.

While various processing techniques and audio signal metric values are discussed herein, any other type of audio signal metric value may be determined using the components of the voice-enabled device 108.

As used herein, a processor, such as processor(s) 116 and/or 800, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 116 and/or 800 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 116 and/or 800 may possess its own local memory, which also may store program components, program data, and/or one or more operating systems.

As described herein, computer-readable media 118 and/or 810 may include volatile and nonvolatile memory, removable and non-removable media implemented in any method or technology for storage of information, such as computer-readable instructions, data structures, program component, or other data. Such computer-readable media 118 and/or 810 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 116 and/or 800 to execute instructions stored on the computer-readable media 118 and/or 810. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 118 and/or 810, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 148 and network interface(s) 828 may enable communications between the voice-enabled devices 108 and the remote system 110, as well as other networked devices. Such network interface(s) can include one or more network interface controllers (NICs) or other types of transceiver devices to send and receive communications over a network.

For instance, each of the network interface(s) 148 and network interface(s) 828 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 148 and network interface(s) 828 may include a wide area network (WAN) component to enable communication over a wide area network. The network 114 may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving a first audio signal generated by a first device in an environment, the first audio signal corresponding to first user speech;
   receiving a second audio signal generated by a second device in the environment, the second audio signal corresponding to the first user speech;
   generating a first set of features from the first audio signal;
   generating a second set of features from the second audio signal;
   calculating a first point in multi-dimensional space corresponding to the first user speech based at least in part on the first and second sets of features;
   grouping each of multiple points in multi-dimensional space into a corresponding cluster in multi-dimensional space, the multiple points in multi-dimensional space including the first point;
   reducing each cluster in multi-dimensional space into a corresponding cluster in two-dimensional Euclidian space; and
   determining regions of the environment based at least in part on the clusters in two-dimensional Euclidian space, the regions including at least a first region corresponding to the first device and a second region corresponding to the second device.

2. A method as recited in claim 1, further comprising:
receiving a third audio signal generated by the first device, the third audio signal corresponding to second user speech;
receiving a fourth audio signal generated by the second device, the fourth audio signal corresponding to the second user speech;
generating a third set of features from the third audio signal;
generating a fourth set of features from the fourth audio signal;
calculating a second point in multi-dimensional space corresponding to the second user speech based at least in part on the third and fourth sets of features;
reducing the second point into a third point in two-dimensional Euclidian space;
determining that the third point is within the first region of the environment; and
selecting the first device to respond to the second user speech.

3. A system comprising:
one or more processors; and
one or more non-transitory computer-readable media storing computer-executable instructions that, when executed, cause the one or more processors to perform acts comprising:
receiving a first audio signal generated by a first device in an environment, the first audio signal corresponding to first user speech;
receiving a second audio signal generated by a second device in the environment, the second audio signal corresponding to the first user speech;
generating features of the first user speech based at least in part on the first and second audio signals;
calculating a first point in multi-dimensional space corresponding to the first user speech based at least in part on the features;
reducing the first point into a second point in two-dimensional Euclidian space;
determining that the second point corresponds to a first region in the environment associated with the first device; and
selecting the first device to respond to the first user speech.

4. The system as recited in claim 3, the acts further comprising:
determining, for a first frequency band, a first signal energy of the first audio signal corresponding to user speech;
determining, for the first frequency band, a second signal energy of the first audio signal corresponding to background noise;
determining, for a second frequency band, a third signal energy of the first audio signal corresponding to user speech; and
determining, for the second frequency band, a fourth signal energy of the first audio signal corresponding to background noise;
and wherein the generating comprises generating the features based at least in part on the first signal energy, the second signal energy, the third signal energy, and the fourth signal energy.

5. The system as recited in claim 3, the acts further comprising:
generating a spectrogram corresponding to the first audio signal;
generating a first-order derivative of the spectrogram; and
determining an amount of edges in the first-order derivative of the spectrogram;
and wherein the generating comprises generating the features based at least in part on the amount of edges in the first-order derivative of the spectrogram.

6. The system as recited in claim 3, the acts further comprising calculating a first-order derivative of the first audio signal in a time domain to determine onset of user speech in the first audio signal over time, and wherein the generating comprises generating the features based at least in part on the onset.

7. The system as recited in claim 3, the acts further comprising calculating a spectral flatness of the first audio signal, and wherein the generating comprises generating the features based at least in part on the spectral flatness.

8. The system as recited in claim 3, the acts further comprising estimating a ratio of harmonic components of the first audio signal to non-harmonic components of the first audio signal, and wherein the generating comprises generating the features based at least in part on the ratio.

9. The system as recited in claim 3, the acts further comprising:
calculating a first value corresponding to a spectral centroid of the first audio signal; and
calculating a second value indicating a distribution of components of the first audio signal about the spectral centroid;
and wherein the generating comprises generating the features based at least in part on the first and second values.

10. The system as recited in claim 3, the acts further comprising determining, for the first audio signal, a frequency value below which a threshold amount of energy of the first signal resides, and wherein the generating comprises generating the features based at least in part on the frequency value.

11. The system as recited in claim 3, the acts further comprising:
grouping each of multiple points in multi-dimensional space into a corresponding cluster in multi-dimensional space, wherein the multiple points in multi-dimensional space include the first point and each of the multiple points in multi-dimensional space corresponds to previous respective user speech;
reducing each cluster in multi-dimensional space into a corresponding cluster in two-dimensional Euclidian space; and
determining regions of the environment based at least in part on the clusters in two-dimensional Euclidian space, each of the regions corresponding a respective device in the environment.

12. A system comprising:
one or more processors; and
one or more non-transitory computer-readable media storing computer-executable instructions that, when executed, cause the one or more processors to perform acts comprising:
receiving a first audio signal generated by a first device in an environment, the first audio signal corresponding to first user speech;
generating one or more features of the first user speech based at least in part on the first audio signal;

calculating a first point in multi-dimensional space corresponding to the first user speech based at least in part on the one or more features;

grouping each of multiple points in multi-dimensional space into a corresponding cluster in multi-dimensional space, the multiple points in multi-dimensional space including the first point;

reducing each cluster in multi-dimensional space into a corresponding cluster in two-dimensional Euclidian space; and determining one or more regions of the environment based at least in part on the clusters in two-dimensional Euclidian space, the regions including at least a first region corresponding to the first device.

13. The system as recited in claim 12, the acts further comprising:

receiving a second audio signal generated by at least one of the first device or a second device in the environment, the second audio signal corresponding to second user speech;

generating one or more second features of the second user speech based at least in part on the second audio signal;

calculating a second point in multi-dimensional space corresponding to the second user speech based at least in part on the one or more second features;

reducing the second point into a third point in two-dimensional Euclidian space;

determining that the third point corresponds to the first region in the environment associated with the first device; and selecting the first device to respond to the second user speech.

14. The system as recited in claim 12, the acts further comprising determining, for a first frequency band, a first signal energy of the first audio signal corresponding to user speech;

determining, for the first frequency band, a second signal energy of the first audio signal corresponding to background noise;

determining, for a second frequency band, a third signal energy of the first audio signal corresponding to user speech; and determining, for the second frequency band, a fourth signal energy of the first audio signal corresponding to background noise;

and wherein the generating comprises generating the one or more features based at least in part on the first signal energy, the second signal energy, the third signal energy, and the fourth signal energy.

15. The system as recited in claim 12, the acts further comprising:

generating a spectrogram corresponding to the first audio signal;

generating a first-order derivative of the spectrogram; and determining an amount of edges in the first-order derivative of the spectrogram;

and wherein the generating comprises generating the one or more features based at least in part on the amount of edges in the first-order derivative of the spectrogram.

16. The system as recited in claim 12, the acts further comprising calculating a first-order derivative of the first audio signal in a time domain to determine onset of user speech in the first audio signal over time, and wherein the generating comprises generating the one or more features based at least in part on the onset.

17. The system as recited in claim 12, the acts further comprising calculating a spectral flatness of the first audio signal, and wherein the generating comprises generating the one or more features based at least in part on the spectral flatness.

18. The system as recited in claim 12, the acts further comprising estimating a ratio of harmonic components of the first audio signal to non-harmonic components of the first audio signal, and wherein the generating comprises generating the one or more features based at least in part on the ratio.

19. The system as recited in claim 12, the acts further comprising:

calculating a first value corresponding to a spectral centroid of the first audio signal; and calculating a second value indicating a distribution of components of the first audio signal about the spectral centroid;

and wherein the generating comprises generating the one or more features based at least in part on the first and second values.

20. The system as recited in claim 12, the acts further comprising determining, for the first audio signal, a frequency value below which a threshold amount of energy of the first signal resides, and wherein the generating comprises generating the one or more features based at least in part on the frequency value.

* * * * *